(12) United States Patent
Gustman

(10) Patent No.: US 6,199,060 B1
(45) Date of Patent: *Mar. 6, 2001

(54) METHOD AND APPARATUS MANAGEMENT OF MULTIMEDIA ASSETS

(75) Inventor: Samuel Gustman, Santa Monica, CA (US)

(73) Assignee: Survivors of THW Shoah Visual History Foundation, Los Angeles, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/076,504

(22) Filed: May 12, 1998

Related U.S. Application Data

(62) Division of application No. 08/678,727, filed on Jul. 10, 1996, now Pat. No. 5,813,014.

(51) Int. Cl.[7] ........................................ G06F 17/30
(52) U.S. Cl. .................... 707/3; 707/1; 707/2; 707/4; 707/5; 707/104; 709/216
(58) Field of Search .................. 707/104, 1, 2, 707/3, 4, 5; 370/338, 395, 367, 452, 231; 395/500, 200.7, 38, 49, 79; 345/352; 709/216; 710/74; 712/220

(56) References Cited

U.S. PATENT DOCUMENTS

| | | | |
|---|---|---|---|
| 5,192,999 | 3/1993 | Graczyk et al. | 348/552 |
| 5,241,671 | 8/1993 | Reed et al. | 707/104 |

(List continued on next page.)

OTHER PUBLICATIONS

IEEE publication, "Database interoperation support in multimedia applications architecture and methodology" by W. A. Gray et al., The Institute of Electrical Engineers, Dept. of Computer Science, UK, pp. 2/1–2/6, Jan. 1998.*

(List continued on next page.)

*Primary Examiner*—Thomas G. Black
*Assistant Examiner*—Diane D. Mizrahi
(74) *Attorney, Agent, or Firm*—The Hecker Law Group

(57) ABSTRACT

The invention is a generalized solution for management of multimedia assets. Generalized interfaces are used between a browser component, indexing server, archive server, tertiary storage manager, and method player components. The generalized interface defines a communication protocol that can be used by any browser, indexing server, archive server, tertiary storage manager, or method player component. Thus, system components supplied by multiple vendors can be interconnected to form a multimedia system that communicates using the generalized interfaces of the invention. A browser component can accept input such as search requests and display multimedia data. An indexing server component includes a data catalogue that catalogues multimedia data. The catalogue can be used to identify catalogue elements associated with data that can satisfy a search request. A search mechanism is used to identify the desired multimedia data. A search mechanism can create additional catalogues that are a subset of the catalogue provided on the indexing server. An archive server identifies a tertiary storage manager that manages the store containing the multimedia data. The tertiary storage manager retrieves the corresponding multimedia data from its store and sends it to a method play which plays it in a display region of the browser. The invention retains the content and results of a search such that it is only necessary to perform a search once. Search elements are used to store the content of a search, i.e., search criteria. A segment element is used to store the results of a search.

18 Claims, 24 Drawing Sheets

U.S. PATENT DOCUMENTS

| | | | |
|---|---|---|---|
| 5,283,638 | 2/1994 | Enberg et al. | 348/14 |
| 5,283,819 | 2/1994 | Glick et al. | 379/93 |
| 5,297,249 | 3/1994 | Bernstein et al. | 384/14 |
| 5,307,456 | 4/1994 | MacKay | 345/328 |
| 5,402,499 | 3/1995 | Robison et al. | 381/119 |
| 5,404,506 | 4/1995 | Fujisawa et al. | 707/4 |
| 5,428,730 * | 6/1995 | Baker | 395/154 |
| 5,434,592 | 7/1995 | Dinwiddie, Jr. et al. | 345/133 |
| 5,436,898 | 7/1995 | Bowen et al. | 370/352 |
| 5,450,581 | 9/1995 | Bergen et al. | 707/9 |
| 5,530,852 | 6/1996 | Meske, Jr. et al. | 709/206 |
| 5,608,900 | 3/1997 | Dockter et al. | 707/102 |
| 5,630,121 | 5/1997 | Braden-Harder et al. | 707/102 |
| 5,649,185 | 7/1997 | Antognini et al. | 707/9 |
| 5,649,186 | 7/1997 | Ferguson | 707/10 |
| 5,754,784 * | 5/1998 | Garland | 395/200.49 |
| 5,774,698 * | 6/1998 | Olnowich | 395/500 |

OTHER PUBLICATIONS

IEEE publication, "Content based navigation in a open hypermedia environment" by P.H. Lewis et al., The Institute of Electical Engineers, Department of Electronics and Computer Science, UK pp. 5/1–5/6, Jan. 1995.*

Musei Vaticani, Internet, (http://www.virtual.co.il/orgs/archival/bookintr.htm), pp 1–10, Dec. 8, 1994.

The Judaica Archival Project, Internet, (http://www.virtual.co.il/orgs/archiva/bookintr.htm), pp 1–11, Apr. 1996.

* cited by examiner

METHOD AND APPARATUS MANAGEMENT OF MULTIMEDIA ASSETS

The invention relates to a system of managing multimedia assets. This is a divisional of application Ser. No. 08/678,727, filed Jul. 10, 1996 and now U.S Pat. No. 5/813,014 filed Sep. 22, 1998.

BACKGROUND OF THE INVENTION

1. Field of the Invention
2. Background

Increasingly, computer systems are being used to present multimedia material. Such material is usually in the form of text, graphics, video, animation, and sound. Two or more of these data types are usually combined to form the multimedia data presented by the computer system. A computer system that is used to present multimedia material is called a multimedia system.

A multimedia system should include components that allow input, information retrieval, and display. FIG. 1A provides an illustration of components for a multimedia system. Client 110 includes an interface capability to accept user input. The user input can specify criteria for identifying multimedia data. Method player 102 converts the media data from its storage version to a playback version for use by client 110.

Index server 108, archive server 106, and tertiary storage 104 provide storage and retrieval capabilities. Index server 108 is used to store and retrieve text data. Information entered in the user interface can be used to retrieve textual information stored by index server 108. The user input might identify a video segment using a title that is associated with the video segment using index server 108, for example. The multimedia data is stored on a physical storage device. A retrieval mechanism is provided to retrieve data from a physical storage device. Archive server 106 locates the multimedia data wherever it is stored and interfaces with tertiary storage manager 105 to access the media data.

Current multimedia systems attempt to provide some or all of the components described in FIG. 1A. However, the components provided by these systems are merged to form a single component thereby making it impossible to separate the merged components into the discrete components described in FIG. 1A. This architecture is disadvantageous for at least two reasons: 1) there is no ability to replace a less capable component with another, more capable component; 2) it forces each system to run on a single hardware platform.

Each system provides vendor-specific implementations in which at least one of the vendor-specific components used in these systems renders the system less viable as a solution for multimedia applications. Since, the services are merged into a single server, there is no ability to remove a less viable component and substitute a more capable component in its place. For example, a vendor may offer a multimedia system that includes its premiere DBMS product as an index server along with a less capable archive server or client. All of the components are intertwined such that it is impossible to substitute another archive server or client for the existing archive server and client. The following provides a brief summary of some existing multimedia systems.

FIG. 1B illustrates one multimedia system having an intermedia server, client and index server combined as a single component that runs on one, monolithic hardware platform. The system is not portable to another hardware platform. It runs on a single hardware platform (i.e., platform 112, a Hewlett Packard platform). The system includes intermedia server 118, index server 116, and client 114. Client 114 is used to make a multimedia request to intermedia server 118. Intermedia server 118 queries index server 116 for information to locate the requested data. Intermedia server 118 uses the data returned from index server 116 to request the data from its archive server and tertiary storage management subsystems.

The archive server and tertiary storage management subsystems are integrated in Intermedia server 118. Client and method player 114 and index server 116 are interconnected with intermedia server 118 to form a single component. The interconnections are hardwired such that it is impossible to replace one of the existing components. Another aspect of the design of this system results in the inability to substitute another component. Client 114 has a built-in method player functionality. Thus, the system expects the client component to include a method player. Yet, most client components that are offered by vendors do not include a method player. Therefore, it is impossible to use a different client or method player component with intermedia server 118.

A multimedia system having a hub is illustrated in FIG. 1C. Such a system is provided by Oracle. The hub is provided by media server 130. The system runs on a specific hardware platform (hardware platform 138, an N-Cube hardware platform) and is not portable to other platforms. Media server 130 acts as a hub that uses a proprietary interface to communicate with the other services. Components with which media server 130 can communicate are method player 122, tertiary storage manager 124, and client 120 (via lines 134, 132, and 136, respectively). These components are merged into a single component thus making it impossible to replace a component. The component formed by media server 130, method player 122, tertiary storage manager 124, index server 128, archive server 126 and client 120 must run on a single hardware platform, platform 138. Further, while index server 128 is a powerful database management system, client 120, archive server 126, method player 122 and tertiary storage 124 offer weak solutions.

A system having an index server, tertiary storage manager, and archive server is illustrated in FIG. 1D. Such a system is provided by IBM. The system offers index server 148 (e.g., IBM's DB2 or Oracle's DBMS), archive server 146, and tertiary storage manager 144 in an integrated system that runs on mainframe 140. Mainframe 140 is an IBM SP2 hardware platform comprised of two RS6000 machines. Mainframe 140 is comprised of processing units 144 in which components (e.g., index server 148) can run. Tertiary storage 144 is connected to one of processing units 144. A request for multimedia content from a client is processed by index server 148. Index server 148 provides selection information that identifies the content which is retrieved from tertiary storage 144. The system is built to run in a mainframe environment using IBM hardware. Further, the system does not include a client or method player. Index server 148, tertiary storage manager 144 and archive server 146 are combined as a single component such that it is impossible to replace one or more of them.

A system having a kernel and data blades that interface with the kernel is illustrated in FIG. 1E. Such a system is provided by Informix. As illustrated below, the system includes kernel 170 that acts as a hub. Kernel 170 is supplemented by a plurality of data blades 160A–160H. Data blades 160A–160H communicate with the kernel using a proprietary interface. A data blade is a complex data type that is defined using a programming language such as "C".

Each data blade (e.g., 160A–160H) is attached to kernel 170 and integrated into data dictionary 172. Data blades 160A–160H can then be used over a file system. Kernel 170 includes a index. Thus, another component must communicate with the index via a proprietary interface provided by a data blade (e.g., data blades 160A–160H). Data blades 160H, 160B, and 160D provide a proprietary interface to method player 162, tertiary storage manager 164, and archive server 166, respectively. The components provided by this system are merged to form a single component that use a proprietary interface to communicate. The component combination runs in a single hardware platform 174. Data dictionary 172 can become large and cumbersome. In addition, a fault that occurs in one data blade that is included in data dictionary 172 causes a fault for the entire system. This system construction is not fault tolerant and is unacceptable for a production environment.

A pre-packaged system having interconnected system components with hardwired, proprietary interconnections is illustrated in FIG. 1F. Such a system is provided by Cinebase. System 178 includes a component formed by method player 182, tertiary storage manager 184, archive server 186, index server 188, and client 190. There is no clear delineation between components. Further, there are no clearly defined lines of communication between the components. Component interconnections are hardwired, and it is therefore impossible to substitute components that can communicate using the existing connections for the existing components. There is no ability to split the component into discrete components such that replacement component can be substituted for one of the existing components. Further, it is impossible to split the combined component into separate components that can run on multiple hardware platforms. The combined component offers a weak solution. The archive server is fast and efficient. Several tertiary storage managers are also provided. The method players are capable. However, the client and index server components provide a weak solution.

None of these systems illustrated in FIGS. 1B–1F provide a general cataloguing capability that can catalogue any type of multimedia data. In addition, none of the systems provided a viable multimedia system solution. That is, none of the systems provide viable options for each of the multimedia components identified in FIG. 1A. All of the systems merge the components identified in FIG. 1A into a single, component that makes it impossible to replace one of the components. Further, by combining the components into a single component, each system must run on a single hardware platform. Further, there is no vendor-independent interface available to integrate components from different vendors to construct a optimum multimedia system.

A number of prior art patents that describe software and/or hardware systems are provided below. These systems do not provide a general cataloguing capability or interfaces to interconnect the multimedia system components identified in FIG. 1A.

A computer system having a television circuit that is capable of receiving television signals and forwarding these signals to the computer system's audio and video subsystems is described in U.S. Pat. Nos. 5,192,999 (Graczyk et al., issued on Mar. 9, 1993), 5,283,638 (Engberg et al., issued Feb. 1, 1994), and 5,283,819(Glick et al., issued Feb. 1, 1994). Video signals are received for display on the computer system's monitor. Audio signals are output using the computer system's speaker(s). A remote control device is used to control the television circuit within the computer system. A computer system having the television circuit can be used in combination with a data/fax/voice modem circuit for telephonic transmission of television signals for teleconferencing purposes.

A service for managing hypertext/hypermedia links is described in U.S. Pat. No. 5,297,249, Bernstein et al., issued on Mar. 22, 1994. A Link Manager Services (LMS) component provides a universal End User Interface (EUI) including menus and dialog boxes that can be called by an application program when a link, or marker, is selected by an application user. The LMS accesses a database that contains information about markers and their associated "presenters" (e.g., application or program). In addition, the LMS includes a viewer capability for viewing and maintaining existing links and creating new links. The LMS is used at runtime to generate menus and dialog boxes and manage the hypertext/hypermedia links.

A system that interconnects audio-video equipment such as video tape record or video production switcher using one or more "AV LANs" in U.S. Pat. No. 5,307,456, Mackay, issued on Apr. 26, 1994. Generic device commands are communicated over an AV LAN to a device translator. The device translator translates the generic command into a device-specific command. The AV LANs are interconnected using bridges. The AV LANs can further be used to interconnect workstations, minicomputers, mainframes and personal computers: The workstations can be used to display information about the resources attached to an AV LAN.

A controller apparatus for use with a computer system that provides programmed volume control of multiple analog input signals such as CD-ROM, telephony, MIDI, PCM, FM, and microphone in U.S. Pat. No. 5,402,499, Robison et al., issued on Mar. 28, 1995. Additionally, the controller can sum multiple inputs and produce multiple audio outputs. The controller provides telephony support such that it receives voice, DTMF and caller ID signals and sends telephonic audio signals.

A multimedia system that provides a multimedia device control program (MMDCP) that interfaces with a multimedia application program (MMAP) and a multimedia presentation manager (MMPM) in OS/2 in U.S. Pat. No. 5,428,730, Baker et al., issued on Jun. 27, 1995. The MMDCP provides a standardized user interface. Because many of the control functions are performed by the MMDCP, a MMAP can be simplified. The MMDCP creates an instance of a control panel for use with a multimedia device. A control panel instance includes UI widgets (e.g., buttons) that allow a user to control the associated device via the control panel instance and the device driver.

An expansion unit to implement multimedia capabilities on an existing computer system (e.g., IBM PS/2) in U.S. Pat. No. 5,434,592, Dinwiddie, Jr. et al., issued on Jul. 18, 1995. The expansion unit is connected to the computer system via an expansion slot and to the computer system's monitor. The expansion slot controls the video presentation displayed on the monitor.

A multimedia network bus (MMNB), multimedia network controller (MMNC) and protocol for transmitting isochronous and packet data between a backbone or wide area network and multiple local area network configurations in U.S. Pat. No. 5,436,898, Bowen et al., issued on Jul. 25, 1995. The MMNC allocates isochronous channels and packet channels to users over the MMNB taking into account the time delay requirements of various data types (e.g., voice, moving images, graphics, or text). The MMNB and MMNC is for use with multimedia applications that require a varying mix of isochronous data and packet data transfers.

SUMMARY OF THE INVENTION

The invention is a generalized solution for management of multimedia assets. Generalized interfaces are used between a browser component, indexing server, archive server, tertiary storage manager, and method player components. The generalized interface defines a communication protocol that can be used by any browser, indexing server, archive server, tertiary storage manager, or method player component. Thus, system components supplied by multiple vendors can be interconnected to form a multimedia system that communicates using the generalized interfaces of the invention.

The browser component can accept input such as search requests and display multimedia data. Search requests are processed by the browser. The indexing server component includes a data catalogue that catalogues multimedia data. The catalogue can be used to identify multimedia data that can satisfy a search request entered using the browser component's user interface. Search mechanisms provided by the browser send requests to the indexing server to query the catalogue and obtain attribute information associated with the catalogue. A search mechanism can create additional catalogues that are a subset of the catalogue provided on the indexing server.

The indexing server's multimedia catalogue includes one or more catalogue elements which can be a complex multimedia asset. A complex multimedia asset can consist of one or more attribute elements. An attribute element is an attribute that can have attributes. A catalogue element is associated with a portion of multimedia data (e.g., one or more frames of video data). The result of a search operation performed by the browser identifies a set of catalogue elements that can satisfy a search request. Each catalogue element has an associated ID (e.g., an integer ID) that uniquely identifies the catalogue element. A set of IDs that represent the set of catalogue elements identified in a search operation are sent to the archive server component for retrieval of the associated multimedia data.

The invention retains the content and results of a search such that it is only necessary to perform a search once. Thereafter, the results of the search can be retrieved without performing the search. Search elements are used to store the content of a search, i.e., search criteria. Search elements include a query and a query element. Query element instances contain the search criteria. A query instance identifies a particular query. A query instance can contain one or more query element instances.

A segment element is used to store the results of a search. A segment element is a multimedia asset. Thus, for example, when a set of catalogue elements is identified from a search operation, a segment element is instantiated. An attribute element of the segment element contains each catalogue element identified in the search operation. A relationship is formed between the segment element and a query instance.

When a search request is entered via the browser's user interface, the query element instances associated with a query instance are examined to determine whether the current search is a reoccurrence of a previous search. If so, the relationship formed between the query instance and the segment instance is used to retrieve the segment that contains the catalogue elements identified in the search operation performed for the query instance. Each catalogue element contained in the segment can then be retrieved and sent to the archive server. The archive server identifies the tertiary storage manager that manages the store containing the multimedia data. The tertiary storage manager retrieves the corresponding multimedia data from its store and sends it to the method play which plays it in a display region of the browser.

Multiple types of catalogue elements can be used with the invention. Preferably, however, one type of catalogue element that is referred to as a phrase is used in the invention. A phrase is associated with a portion of multimedia data. A phrase has a plurality of attributes some of which are attribute elements (i.e., an attribute that has associated attributes). The attribute elements that are attributes of a phrase include keyword, person, image, video (e.g., documentary footage), proposed person, and proposed keyword.

To locate multimedia data associated with a phrase, the archive server component retains information for each phrase in the catalogue such as the ID and a pointer to the physical storage location of the data associated with the phrase. When the archive server receives a set of phrase IDs, it uses the physical storage pointer associated with each phrase to locate the multimedia data. A phrase object is created to retain the multimedia data associated with a phrase. Multimedia data retrieved from permanent storage into phrase object instances.

DETAILED DESCRIPTION OF THE INVENTION

A method and apparatus for managing multimedia assets is described. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Figure 1A:
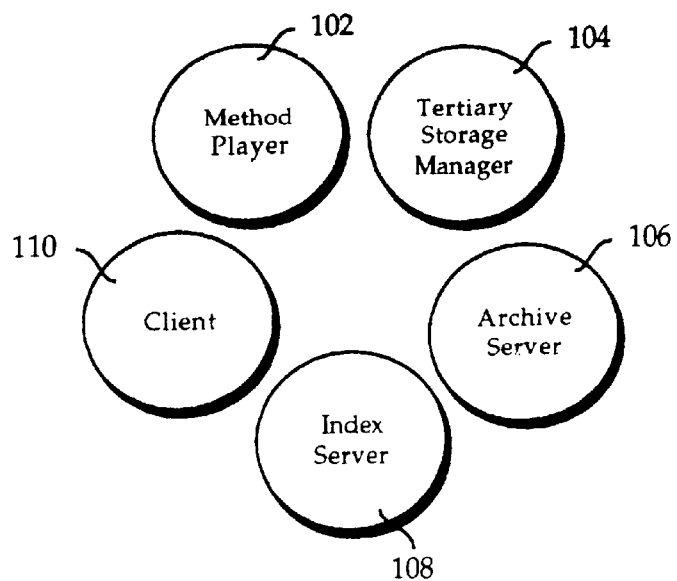
FIG. 1A provides an illustration of components for a multimedia system.
Figure 1B:
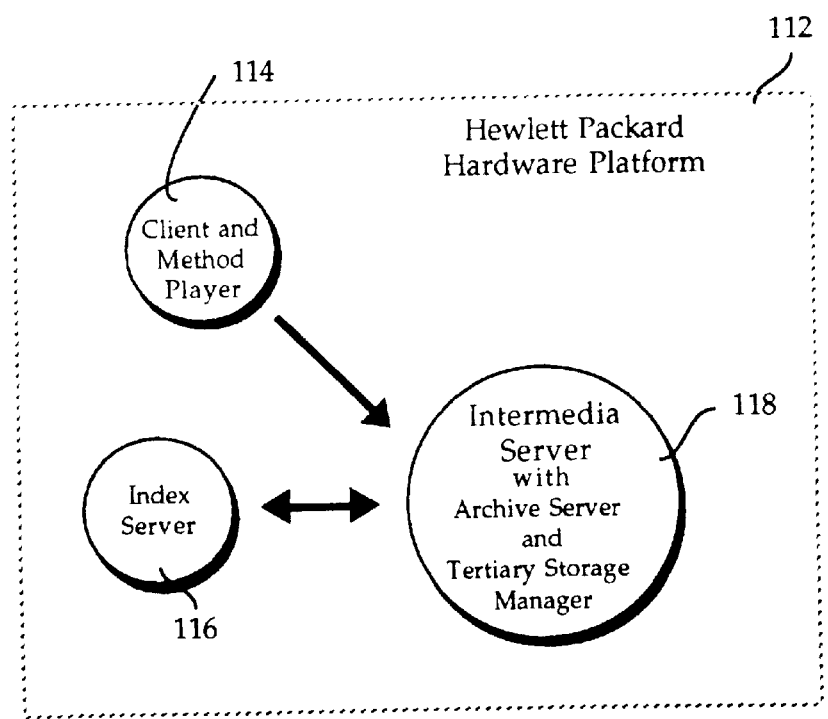
FIG. 1B–1F illustrate pre-packaged multimedia systems having interconnected system components with hardwired, proprietary interconnections.
Figure 1C:
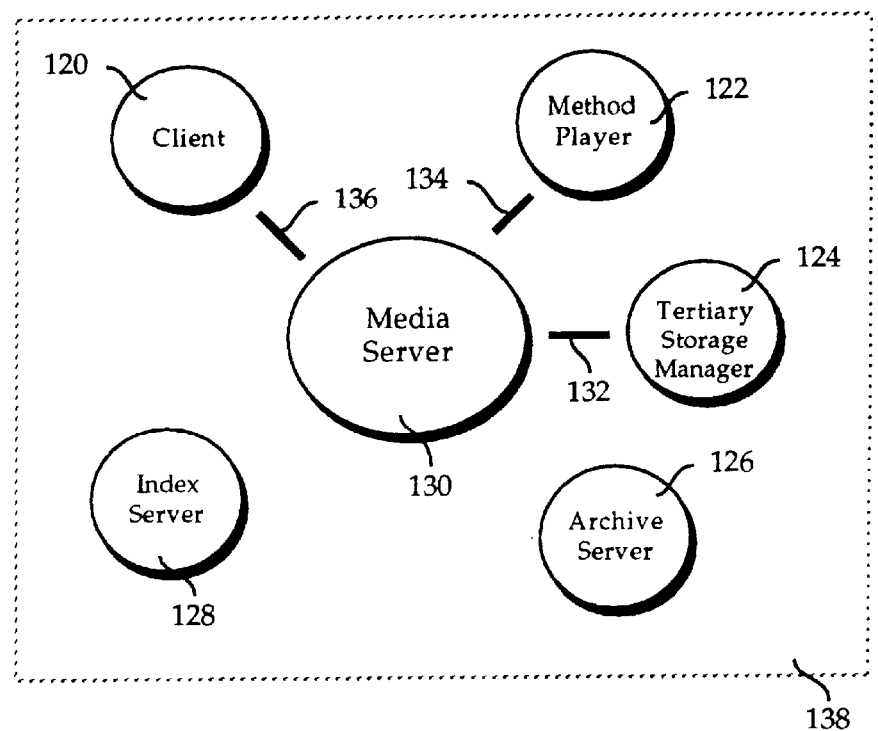
Figure 1D:
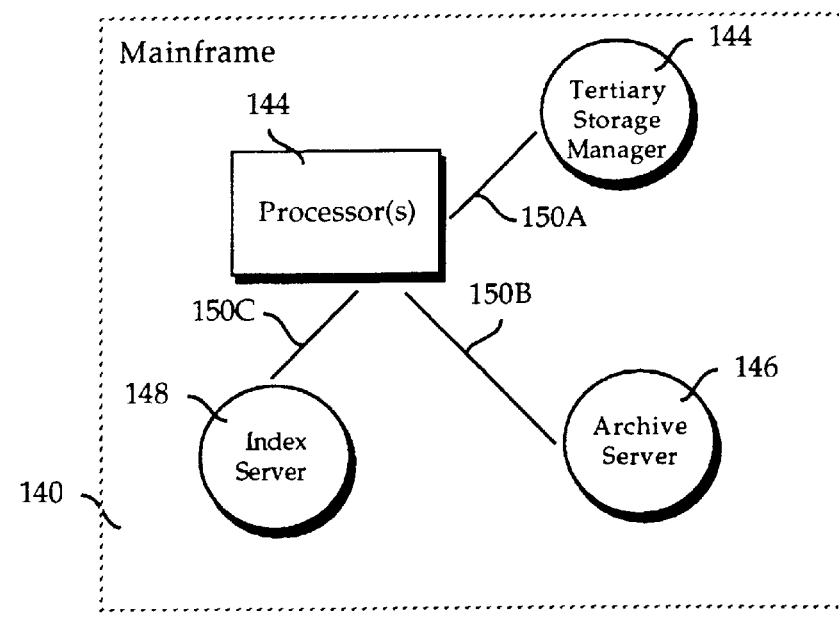
Figure 1E:
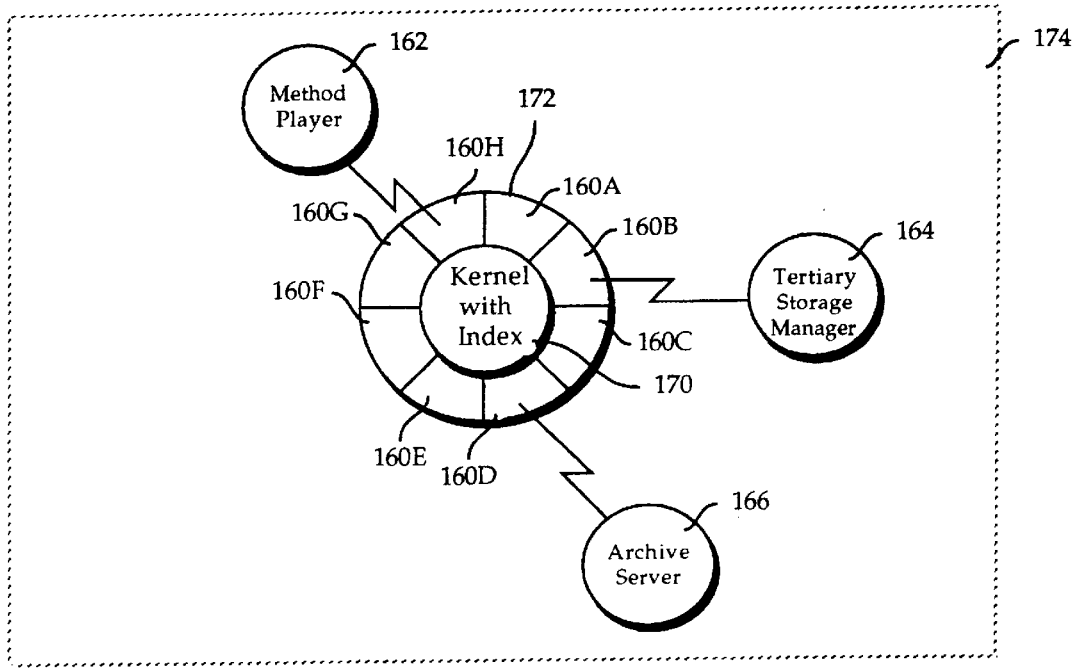
Figure 1F:
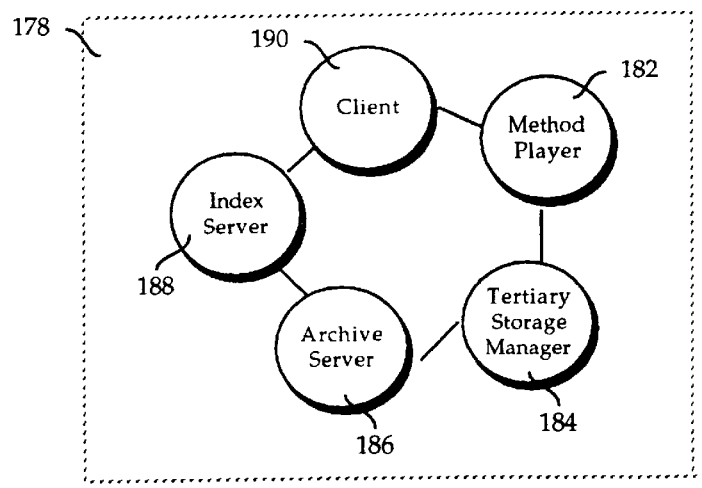
Figure 2:
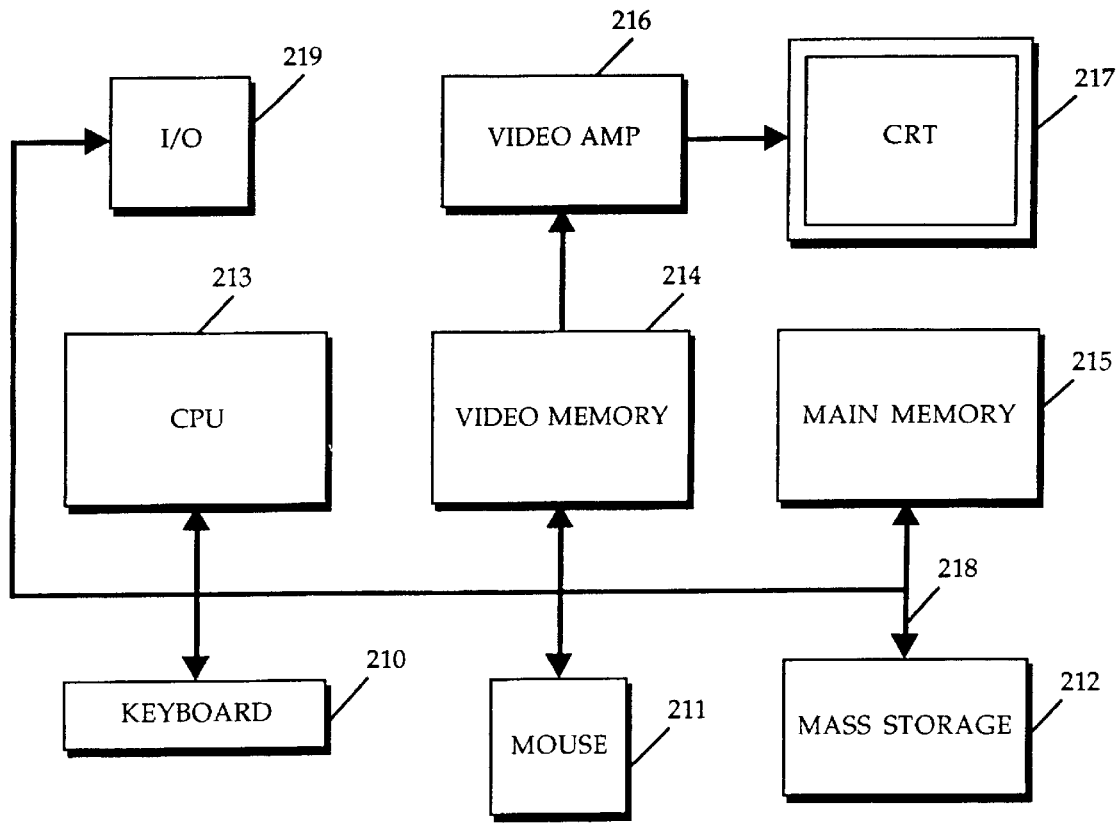
FIG. 2 provides an example of a general purpose computer to be used with the present invention.

An embodiment of the invention can be implemented as computer software in the form of computer readable program code executed on a general purpose computer such as illustrated in FIG. 2. A keyboard 210 and mouse 211 are coupled to a bi-directional system bus 218. The keyboard and mouse are for introducing user input to the computer system and communicating that user input to central processing unit (CPU) 213. Other suitable input devices may be used in addition to, or in place of, the mouse 211 and keyboard 210. I/O (input/output) unit 219 coupled to bi-directional system bus 218 represents such I/O elements as a printer, network communications card, modem, A/V (audio/video) I/O, etc.

The computer system of FIG. 2 also includes a video memory 214, main memory 215 and mass storage 212, all coupled to bi-directional system bus 218 along with keyboard 210, mouse 211 and CPU 213. The mass storage 212 may include both fixed and removable media, such as magnetic, optical or magnetic optical storage systems or any other available mass storage technology. Bus 218 may contain, for example, thirty-two address lines for addressing video memory 214 or main memory 215. The system bus 218 also includes, for example, a 32-bit data bus for transferring data between and among the components, such as CPU 213, main memory 215, video memory 214 and mass storage 212. Alternatively, multiplex data/address lines may be used instead of separate data and address lines.

In one embodiment of the invention, the CPU 213 is a microprocessor manufactured by Motorola, such as the 680×0 processor or a microprocessor manufactured by Intel, such as the 80×86, or Pentium processor, or a SPARC microprocessor from Sun Microsystems. However, any other suitable. microprocessor or microcomputer may be utilized. Main memory 215 is comprised of dynamic random access memory (DRAM). Video memory 214 is a dual-ported video random access memory. One port of the video memory 214 is coupled to video amplifier 216. The video amplifier 216 is used to drive the cathode ray tube (CRT) raster monitor 217. Video amplifier 216 is well known in the art and may be implemented by any suitable apparatus. This circuitry converts pixel data stored in video memory 214 to a raster signal suitable for use by monitor 217. Monitor 217 is a type of monitor suitable for displaying graphic images.

The computer system described above is for purposes of example only. An embodiment of the invention may be implemented in any type of computer system or programming or processing environment.

Figure 3:
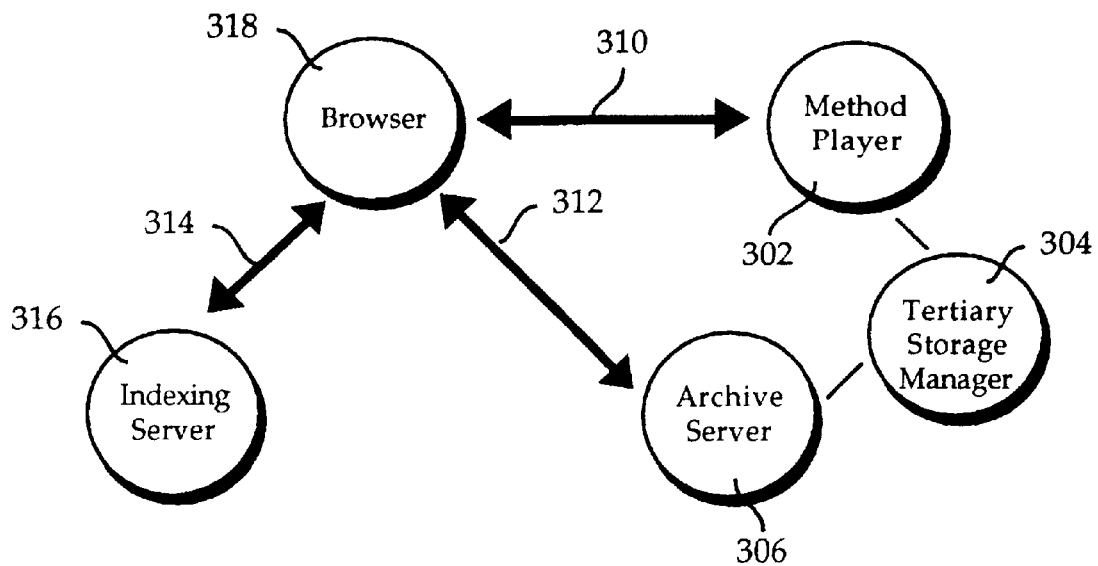
FIG. 3 illustrates an embodiment of the invention having generalized interfaces between system components.

The invention implements a generalized interface for interconnecting system components of a multimedia system. Thus, it is possible to integrate components from different systems or vendors to design an optimal multimedia system. FIG. 3 illustrates an embodiment of the invention having generalized interfaces between system components.

Browser 318 includes a user interface that accepts input from a user and displays multimedia data. Browser 318 formulates requests based on user-specified criteria for transmittal to indexing server 316. Indexing server 316 includes a mechanism for identifying stored multimedia data based on the request sent by browser 318. Archive server 306 and tertiary storage manager 304 retrieve the stored multimedia data identified by indexing server 316. Method player 302 converts the stored multimedia data into a form that can be played on browser 318.

Interfaces are used between the system components to facilitate inter-component communication. Interface 314 facilitates communication between browser 318 and indexing server 316, for example. Interfaces 312 and 310 facilitate communication between browser 318 and archive server 306, and browser 318 and method player 302, respectively. Preferably, interfaces 310, 312, and 314 are software interfaces such as an application program interface (API).

Interfaces 310, 312, and 314 provide a clearly-defined communication mechanism that can be used to send and receive information and initiate another component's operations. That is, interface 310, 312, and 314 establish a protocol that can be used by the system components. Further, a substitute component can adopt the protocols provided by interfaces 310, 312, or 314 to communicate with another component. Browser 318, method player 302, and/or indexing server 316 can therefore be any vendor-supplied or custom-built component.

Browser 318 accepts a request from a user via its user interface, requests the identity of multimedia data from indexing server 316 via interface 314, and transmits the identity of the multimedia data received from indexing server 316 to archive server 306 via interface 312. Tertiary storage manager 304 can consist of one or more instances each of which can manage a tertiary storage device. Such a device is a tape robot mass storage device manufactured by E-Mass, for example. Archive server 306 identifies the instance of tertiary storage manager 304 that manages the multimedia data. Tertiary storage manager 304 retrieves the multimedia data from the storage device and transmits the data to method player 302. Method player 302 converts the multimedia data into a form suitable for display and transmits it to browser 318 via interface 310. Multimedia data can be transmitted between browser 318 and method player 302 based on play control commands (e.g., fast forward, reverse, fast reverse, etc.) sent from browser 318 to method player 302 via interface 310. Preferably, an MPEG board such as that manufactured by Optivision is used to play the multimedia data on browser 318.

Indexing Server

The indexing server catalogues data such as multimedia data. Preferably, the indexing server includes a DBMS. A data manipulation language (DML) such as Structured Query Language (SQL) can be used to facilitate storage and retrieval operations invoked on a catalogue and its attributes. A detailed discussion of a catalogue for multimedia data is provided in a co-pending U.S. Patent Application entitled "Method and Apparatus for Cataloguing Multimedia Data", Ser. No. 08/680,504, filed on Jul. 8, 1996 now U.S. Pat. No. 5,832,495 and incorporated herein by reference. The following provides a short discussion of a multimedia catalogue and the attributes and attribute elements associated with a catalogue.

A catalogue is a collection of one or more catalogue elements. An index is used to access a catalogue. An element of a catalogue has one or more attributes. An attribute provides information that can be used to search for, answer questions about, and navigate through a catalogue. An attribute of a catalogue element can be an element that has attributes. A catalogue element attribute that is an element is referred to as an attribute element. Attribute elements and attributes are used to build an index that can be used to facilitate catalogue access. Within a catalogue, smaller catalogues can be created by, for example, querying and user designation.

Catalogue and Attribute Elements

The multimedia data catalogue used in the invention preferably consists of one catalogue element that is referred to as a phrase. A phrase is associated with a portion of multimedia data. A phrase has a plurality of attributes some of which are attribute elements. The attribute elements that are attributes of a phrase include keyword, person, image, video (e.g., documentary footage), proposed person, and proposed keyword. The keyword, person, image, proposed person and proposed keyword attribute elements can have attributes that are also attribute elements. For example, attribute elements that are attributes of the keyword attribute element include thesaural keyword, thesaural person, keyword, and type. An index is built on the attributes and attribute elements. The index can be used to navigate through the catalogue (e.g., search for phrases).

Figure 4A:
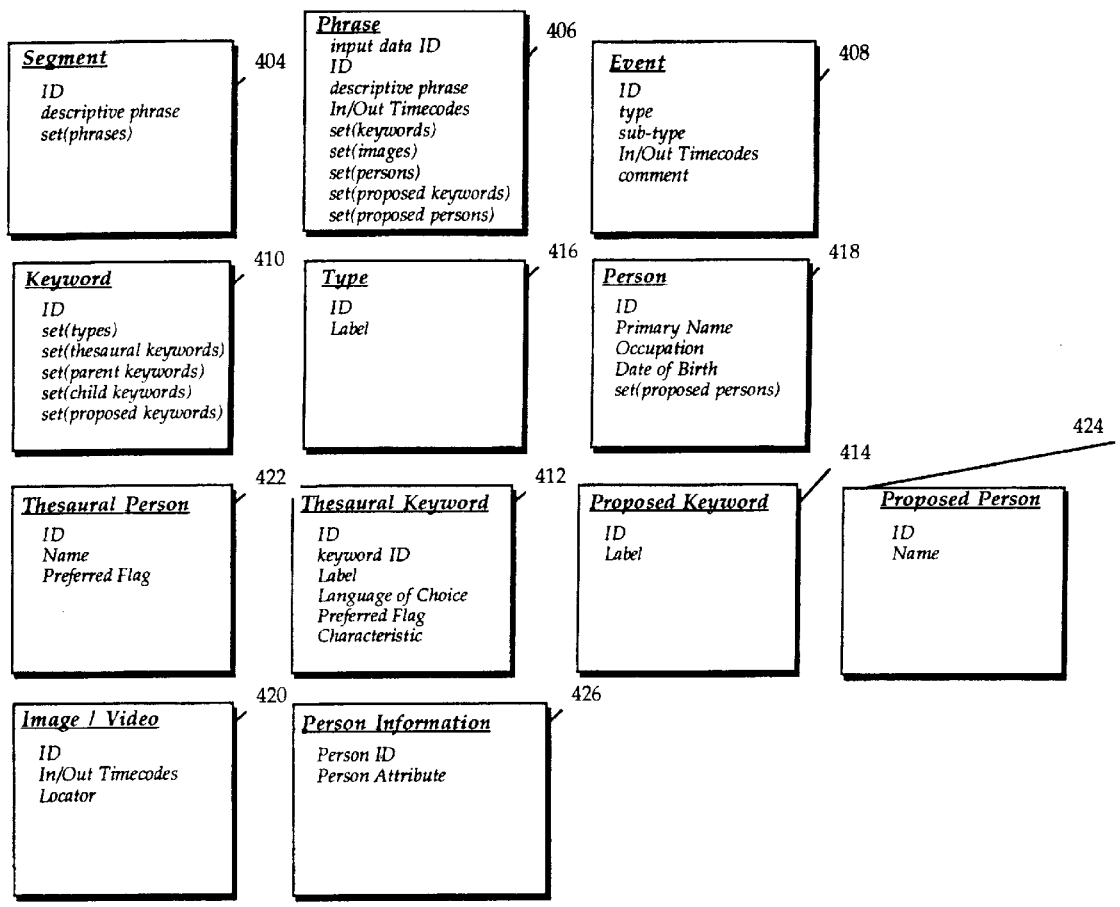
FIG. 4A provides an example of elements in the indexing template and their attributes according to an embodiment of the invention.

FIG. 4A provides an example of catalogue and attribute elements and their attributes according to an embodiment of the invention. Segment 404 is a container element. It can contain other elements. For example, segment 404 can contain one or more instances of phrase 406. In the invention, input data is decomposed into one or more pieces, or fragments. An instance of phrase 406 is associated with each input data fragment. Phrase 406 is a catalogue element. Phrase 406 has one or more attributes and/or attribute elements on which an index is built. The index can be used to navigate through the catalogue.

An attribute of phrase 406 is keyword 410. An instance of phrase 406 can be associated with one or more instances of keyword 410. Keyword 410 further defines aspects of an input data fragment. Preferably, an attribute of keyword 410 identifies content, or substance, for an input data fragment. The content or substance identified by keyword 410 is preferably expressed as a single word. However, content or substance can be expressed using multiple words.

To illustrate, the input data can be a videotape. The videotape is, for example, that of an interview conducted with a survivor of the Holocaust. The interview is broken down into the interviewee's pre-war, war-time, and post-war experiences. The interviewee's pre-war experience can be broken down into topics. A pre-war topic might be the interviewee's personal life, for example. Each topic can be broken down into sub-topics. In the example of the interviewee's personal life, a sub-topic might be the interviewee's relationship with family members, experiences at school, etc. Each sub-topic contains an information item. To further illustrate using the current example, an information item might be home, brother, sister, teacher, etc. In this example, the topic of the interviewee's personal life becomes an instance of segment 404. The interviewee's relationship with family members and experiences at school become instances of phrase 406. The words home, brother, sister, and teacher become instances of keyword 410. The words home, brother, sister and teacher provide information regarding the content or substance of an input data fragment.

An instance of keyword 410 can be associated with one or more instances of thesaural keyword 412. An instance of thesaural keyword 412 is an instantiation of an instance of keyword 410. Thesaural keyword 412 specifies a value or label for its associated instance of keyword 410. Thesaural keyword 412 can be one or more words. Thesaural keyword 412 can be used, for example, to specify a value for an instance of keyword 410 in a particular language. Multiple instances of thesaural keyword 412 can be used to express the value of an instance of keyword 410 in multiple languages. Alternative expressions for the value of an instance of keyword 410 can be retained by instances of thesaural keyword 412 as well. Thus, the content or substance of an input data fragment can be expressed in multiple languages with a plurality of alternative expressions in each language. A preference can be associated with an instance of thesaural keyword 412 to identify it as a preferred alternative in a given language.

Figure 4B:
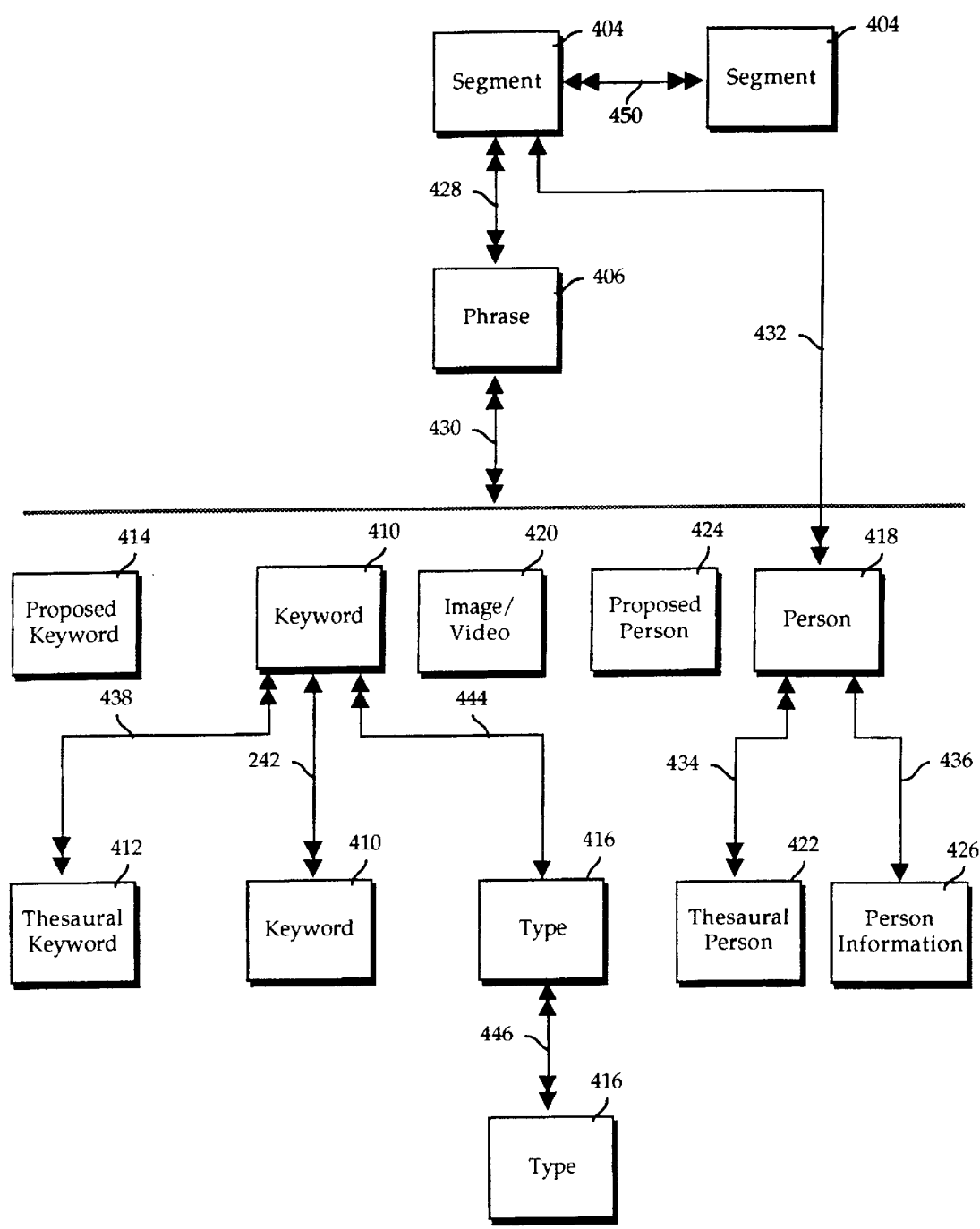
FIG. 4B illustrates relationships formed between the elements identified in FIG. 4A according to an embodiment of the invention.
Figure 4C:
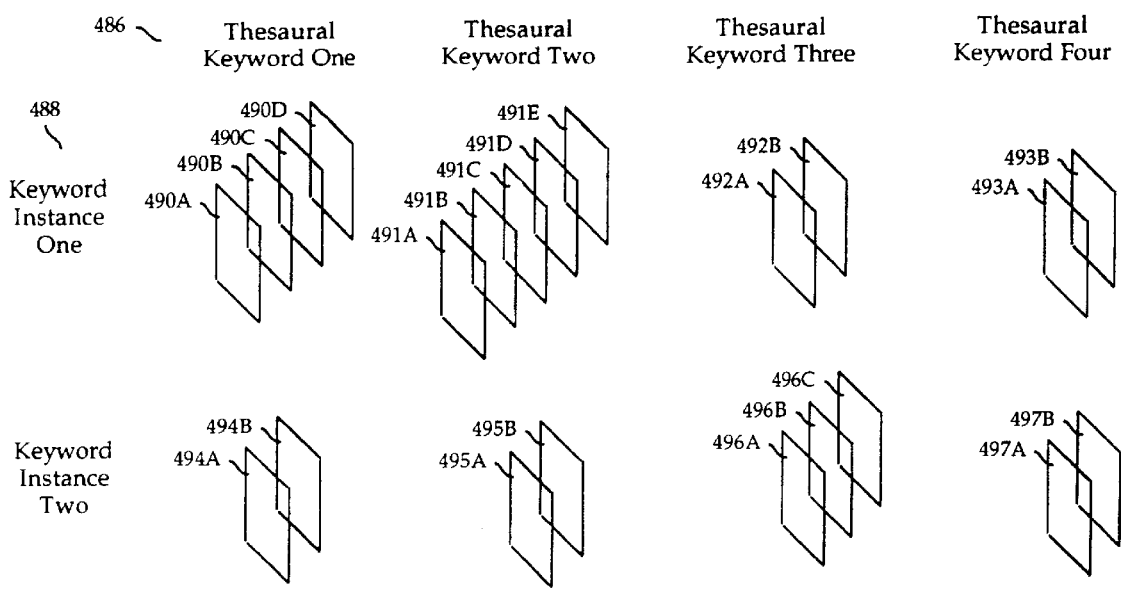
FIG. 4C provides an illustration of instances of keyword 410 and a plurality of associated label attributes according to an embodiment of the invention.

FIG. 4C provides an illustration of instances of keyword 410 and a plurality of associated label attributes according to an embodiment of the invention. A grid is displayed with axes 486 and 488. Instances of keyword 410 are displayed along a vertical axis, axis 486. A horizontal axis, axis 486 contains examples of languages in which a label associated to an instance of keyword 410 can be represented. Instances of thesaural keyword 412 are depicted at the intersections of these two axes.

Each instance of thesaural keyword 412 is an instantiation for an associated instance of keyword 410. Each instance of thesaural keyword 412 contains a label that can be used as the label for an instance of keyword 410. For example, thesaural keywords 490A–490D, 491A–491E, 492A–492B, and 493A–493B are instantiations of Keyword Instance One. Similarly, thesaural keywords 494A–494B, 495A–495B, 496A–496C, 497A–497B are instantiations of Keyword Instance Two.

An instance of thesaural keyword 412 can be an instantiation of an instance of keyword 410 in a particular language. For example, thesaural keywords 491A–491E are English instantiations of Keyword Instance One. Thesaural keywords 491A–491E provide alternate instantiations for Keyword Instance One. That is, each contains a English-language label for Keyword Instance One. Thus, Keyword Instance One can be associated with a different English-language label based on which instance of thesaural keywords 491A–491E is used to supply the label for Keyword Instance One. Similarly, Keyword Instance is associated with English-language alternatives contained in thesaural keywords 495A–495B.

Thus, within a language, an instance of keyword 410 can have alternate instantiations of thesaural keyword 412. An instance of keyword 410 can also have alternate instantiations of thesaural keyword 412 across multiple languages as exemplified in FIG. 4E. Alternate instantiations for Keyword Instance One exist in French (e.g., thesaural keywords 490A–490D), German (e.g., thesaural keywords 492A–492B), and Russian (e.g., thesaural keywords 493A–493B), for example. Similarly, Keyword Instance Two has alternative instantiations in French (e.g., thesaural keywords 494A–494B), German (e.g., thesaural keywords 494A–494C), Russian (e.g., thesaural keywords 497A–497B).

A preferred alternate instantiation of an instance of keyword 410 can be identified in each of the languages in which the keyword instance is represented. Thus, for example, thesaural keyword instance 490C can be identified as the preferred instantiation of Keyword Instance One for the French language. Similarly, thesaural keyword instances 491B, 492A, and 493B can be the preferred English, German, and Russian (respectively) instantiations for Keyword Instance One. Thesaural keyword instances 494A, 495B, 496C, and 497A can be the preferred French, English, German, and Russian instances (respectively) for Keyword Instance Two.

Referring to FIG. 4A, type 416 is associated with keyword 410. Type 416 provides attribute information for keyword 410. Type 416 can be used to include instances of keyword 410 in a classification or category. In other words, an instance of keyword 410 is an instantiation of an instance of type 416. For example, an instance of keyword 410 having an attribute of "Ford Bronco" could be associated with a type instance having an attribute of "car". Another instance of keyword 410 having an attribute of "Mustang" can also be associated with the same instance of type 416. Both instances of keyword 410 are instances of a car. One or more instances of type 416 can be associated with an instance of keyword 410. In the preferred embodiment, a hierarchy is established for instances of type 416. An instance of type 416 can be a parent to or a child of another other instances of type 416. An instance of keyword 419 that is associated with an instance of type 416 is also associated with the hierarchy of the instance of type 416.

Other attribute elements that can be associated with an input data fragment via phrase 406 include person 418, and image 420. Person 418 identifies an individual associated with an input data fragment. In the previous example, a personal life experience may contain a reference to a person. An instance of person 418 can be used to identify the reference. Person information 426 provides attribute information for an instance of person 418. An instance of image 420 is used for data such as a still photograph that is referenced in the input data.

In the preferred embodiment of the invention, some elements, such as keyword 410 and person 418, must be approved before becoming actual instances. Prior to approval, the instances are considered to be proposed instances. For example, proposed keyword 414 and proposed person 424 are attribute elements used to identify instances of keyword 410 and person 418 that have not yet been approved as actual instances. Proposed instances are reviewed and a determination is made whether to transform the proposed attribute element into an actual attribute element or to otherwise dispose of the proposed attribute element.

Person Information 426 is an attribute element associated with person 418. A "one-to-one" relationship (relationship 436) exists between person information 426 and person 418. Person information 426 contains attributes for person 418. The attributes of person information 426 contain information for a person having an instance of person 418.

Events can also be associated with input data. Each event becomes an instance of event 408. As previously described, input data can be decomposed into input data fragments each of which is associated with an instance of phrase 406. Input data can also be decomposed into input data fragments that are associated with instances of event 408. A type attribute is associated with event 408. Examples of an event type in the preferred embodiment include a segment, phrase, break between tapes, quality assurance details, facts, and miscellaneous (or other). An event can be used to access the associated input data fragment. An instance of event 408 can be used to access an input data fragment. For example, an instance of event 408 of type phrase can be used to locate the input data fragment associated with an instance of phrase 406.

Another example of an event type is a quality assurance event. In the preferred embodiment of the invention, a quality assurance mechanism can be used to monitor the quality of the input data and provide feedback. Quality assurance events are used to mark the input data. An event can mark a positive, negative, or neutral quality assurance event. For example, video input data is being collected in multiple interviews. Each interview can be reviewed to identify parts of the interview process that are noteworthy. Where, for example, an interviewer does not follow-up with an interviewee to obtain additional details, a negative quality assurance event can be created. A positive event can be similarly created. An event that is neither positive nor negative (i.e., informational or neutral) can also be created. A report of quality assurance events can be generated and used to provide feedback to the persons involved in collecting the input data.

Relationships of Elements

In the preferred embodiment, catalogue and attribute elements are interrelated. Relationships are formed between two or more elements using the invention. FIG. 4B illustrates relationships formed between the elements identified in FIG. 4A according to an embodiment of the invention. A "many" relationship is signified using a double arrow. A "one" relationship is identified using a single arrow. Relationship 428, for example, is a "many-to-many" relationship. That is, one or more instances of segment 404 can be related to many instances of phrase 406. Alternatively stated, segment 404 contains one or more instances of phrase 406. One instance of phrase 406 can be related to multiple instances of segment 404. That is, an instance of phrase 406 is contained within one or more instances of segment 404. As illustrated by relationship 446, one or more instances of type 416 can be related to other instances of type 416.

A "many-to-many" relationship (relationship 430) exists between phrase 406 and proposed keyword 414, keyword 410, image/video 420, proposed person 424 and person 418. An instance of phrase 406 can be related to a set of proposed keywords, a set of keywords, a set of images and/or video, a set of proposed persons, and a set of persons, each set having zero or more members. Further, an instance of proposed keyword 414, keyword 410, image 420, proposed person 424 or person 418 can be related to more than one instance of phrase 406.

Relationship 438 illustrates a "many-to-many" relationship between keyword 410 and thesaural keyword 412. An instance of keyword 410 can be associated with one or more instances of thesaural keyword 412. The same instance of thesaural keyword 412 can be associated with one or more instances of keyword 410.

As previously stated, instances of type 416 can be interrelated with other instances of type 416 via a type hierarchy. Relationship 444 identifies an instance of type 416 as a parent or child of another instance of type 416. Similarly, the instances of keyword 410 are interrelated via a keyword hierarchy. Keyword 410 can be related to other instances of keyword 410 via relationship 442. Relationship 442 identifies an instance of keyword 410 as a parent or child of another instance of keyword 410. Relationship 444 relates keyword 410 and type 416. That is, one instance of keyword 410 is related to an instance of type 416. Conversely, an instance of type 416 can be associated with multiple instances of keyword 410.

Further, an instance of keyword 410 can be related to many instances of type 416 via relationships 442 and 446. That is, an instance of keyword 410 has a type that is associated with an instance of type 416. In addition, the instance of keyword 410 inherits the types associated with the children of its associated instance of type 416.

Person 418 and person information 426 have a "one-to-one" relationship via relationship 428. Person 418 and thesaural person 422 are related via relationship 434. Person 418 can be associated with multiple instances of thesaural person 422. An instance of thesaural person 422 can be related to multiple instances of person 418 via relationship 434.

Segment 404 is a container element. That is, as illustrated by relationship 428, segment 404 can contain multiple instances of phrase 406. Segment 404 is defined by the set of elements that it contains. For example, segment 404 is, for example, a chapter segment, a testimony segment, or a general segment. Instances of phrase 406 can be grouped in the order in which they occur in the input data in a chapter segment. As a testimony segment, segment 404 contains a grouping of instances of 404 associated with the input data. For example, a testimony segment can contain all instances of segment 404 that are associated with a videotaped interview. Relationship 450 illustrates the relationship between instances of segment 404 (i.e., a testimony segment) that act as a container for other instances of segment 404. A general segment contains a set of instances of phrase 406 that are not necessarily related to particular input data. A general segment can be a collection of phrases that meet a certain criteria. For example, a general segment can contain instances of phrase 406 that are related to an instance of keyword 410 having a value of "teacher".

Segment 404 therefore identifies a group of catalogue elements (e.g., phrase 406. An instance of segment 404 can identify all catalogue element instances. Other instances of segment 404 can identify a subset of catalogue elements. Thus, for example, an instance of segment 404 can identify all instances of phrase 406 or a some subset of all of the instances of phrase 406. The set including all instances of phrase 406 is a catalogue. A smaller catalogues that contain a subset of all instances of phrase 406 is also a catalogue. Within a catalogue, a smaller catalogue can be created by, for example, a query operation or user designation.

A set of catalogue elements can be identified by querying the attribute elements, for example. A query operation can be performed on the attribute elements to examine other attribute elements associated with a catalogue element. A query operation identifies a set of cataloguing elements (e.g., instances of phrase 406) that satisfy the criteria specified in the query. A set of cataloguing elements identified in a query are grouped in an instance of segment 404. A user can also specify a collection of phrases 406 that can be grouped in an instance of segment 404.

Attributes

FIG. 4A provides examples of attributes for catalogue and attribute elements according to an embodiment of the invention. Segment 404 contains an identifier (ID), a descriptive phrase, and a set of phrases, for example. The phrases related to an instance of segment 404 are included in the segment instance's set of phrases. A set is formed by creating relationships between the elements. FIG. 4B illustrates examples of the relationships that exist between elements in an embodiment of the invention. The relationships that form a set can be implemented using any of the known techniques known in the art. For example, the relationships can be implemented in a programming language using pointers. In a relational database management system, for example, the relationships can be formed using relations and primary and foreign keys.

Referring to FIG. 4A, phrase 406 includes an input data ID (e.g., identifies the input data from which the phrase was generated), an ID, a descriptive phrase, In/Out timecodes (i.e., a corresponding location within the input data), a set of keywords, images, persons, proposed keywords, and proposed persons. Keyword 410 includes an ID, and sets of types, thesaural keywords, child keywords and parent keywords. The child and parent keyword set form relationships for the keyword hierarchy. The set of thesaural keywords related to keyword 410 contain keyword values or labels for keyword instance.

Person 418 includes an ID, a primary name, an occupation, date of birth, and a set of proposed persons. Person information 426 contains a person ID for the associated instance of person 418. Person information 426 contains one or more attributes for the associated instance of person 418. The attribute information can vary depending on the multimedia information being catalogued. For example, the catalogued multimedia data may consist of interviews with individuals. An instance of person 418 can be instantiated and associated with an interviewee. Person information 426 associated with the instance of person 418 can then include biographical information of the interviewee. The multimedia data videotaped sporting events. In this case, an instance of person 418 can be created for a person associated with the sporting event (e.g., player, referee, and broadcasting personnel). An instance of person information 426 associated with the instance of person 418 can include statistical information associated with the participant.

An event 408 includes an ID, type (e.g., segment, phrase, interviewer, videographer, fact, or other), sub-type (e.g., a positive, negative, or informational event), timecodes, and a comment (or descriptive note).

Thesaural keyword 412 includes an ID, a keyword ID (i.e., the ID for an instance of keyword 410 for which the thesaural keyword instance is an alternative), a label (i.e., the value of the keyword instance to which the thesaural instance is related), a language of choice identifier (or language ID), a preferred flag, and a characteristic (or class). If set, the preferred flag specifies that the thesaural keyword instance is the preferred alternative for the related keyword instance in the language specified by the language ID. The characteristic attribute further defines the thesaural keyword instance. It can be used to identify that thesaural keyword instance is a slang word, for example.

An ID, timecode and locator are included as attributes for image 420. The locator attribute is used to locate the digitized image, for example. Proposed keyword 414 includes an ID and a label. It is also possible to include the attributes contained in keyword 410 in proposed keyword 414. Thus, the user that is proposing a new keyword can enter as much information regarding the proposed keyword. Proposed person 424 includes an ID and name attribute. Like proposed keyword 414, the attributes associated with person 418 can be included in proposed person 424. Type 416 includes an ID and a label.

Elements and their relationships can be managed using a cataloguing mechanism and a relationship management mechanism. The cataloguing mechanism includes a user interface that includes a series of screens. During cataloguing, a user (e.g., a cataloguer) reviews the input data and causes elements to be instantiated and associated with the input data and other elements. Elements that already exist can be associated with the input data during cataloguing. In addition, a cataloguer can propose new elements and relationships. The relationship management facility is used to review the elements and relationships proposed by a cataloguer. The relationship management facility can also be used to create new elements and relationships.

Browser and Indexing Server Interface

Figure 5:
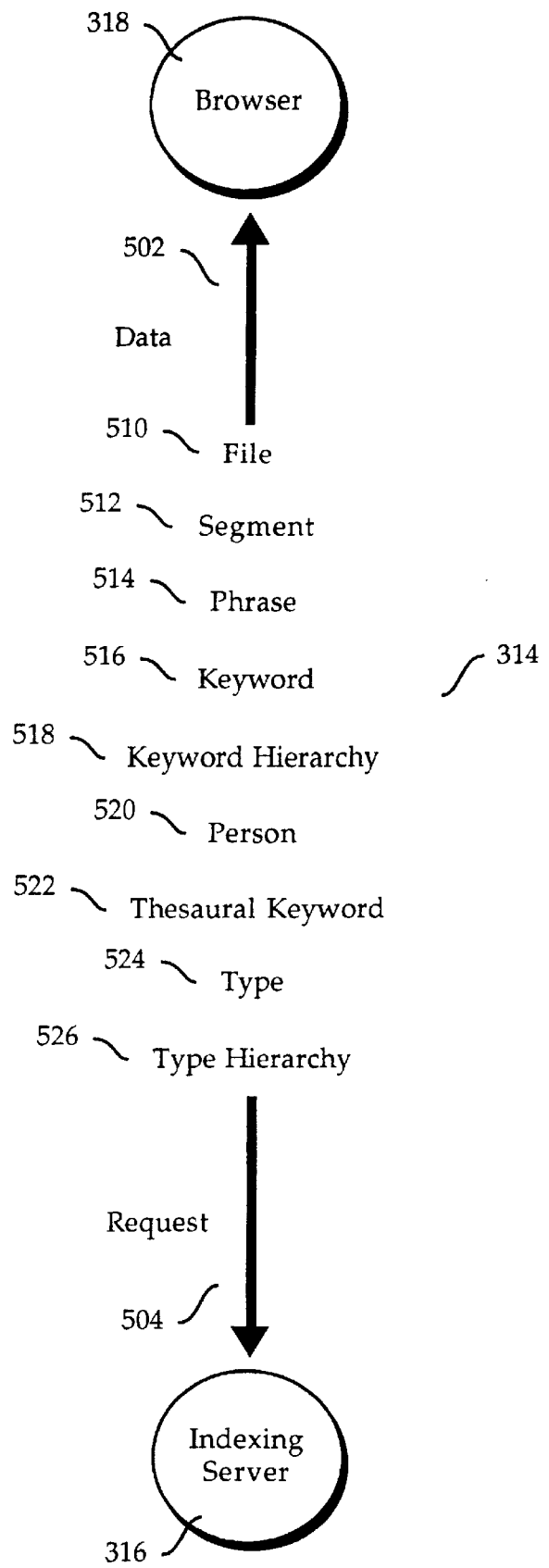
FIG. 5 provides an overview of an interface between a browser component and an indexing server component according to an embodiment of the invention.

Browser 318 and indexing server 316 interact to query a multimedia catalogue and identify catalogue elements (e.g., instances of phrase 406) that satisfy specified criteria. Interface 314 provides a protocol to facilitate communication between browser 318 and indexing server 316. Interface 314 includes program interfaces to query the catalogue and attribute elements associated with the catalogue. FIG. 5 illustrates an overview of interface 314 between browser 318 and indexing server 316 according to an embodiment of the invention.

Interface 314 provides a mechanism for browser 318 to communicate request 504 to indexing server 316 and for indexing server 316 to transmit data 502 to browser 318 in response to request 504. Various groupings of routines are provided by interface 314 to query the catalogue and its attributes and attribute element instances. One group of routines that returns data associated with a general segment is file routines 510. File routines 510 includes routines that return the number of phrases, keywords, thesaural keywords, person keywords, or segments in a general segment. Other routines return the phrases, keywords, thesaural keywords, person keywords or segments in a general segment. Routines are provided in segment routines 512 that return similar information as those in file 510 for other segment types.

Phrase routines 514 contains routines that retrieve information associated with phrase 406 such as in or out timecodes for, or the number or instances of keywords in, an instance of phrase 406. Other routines in phrase routines 514 search the descriptive phrase attribute of phrase 406 to identify instances of phrase 406 that contain a search string. The number or actual instances of phrase 406 that contain the search string can be returned to browser 318.

Keyword group 516 contains routines that identify the instance of type 416 associated with an instance of keyword 410. Routines in this group can return the number or instances of segment 404 (e.g., general segment or other segment) or phrase 406 that are associated with an instance of keyword 410. Other routines identify instances of keyword 410 having an associated label or a descriptive phrase that contains a search string.

The keyword hierarchy is queried using routines in keyword hierarchy group 518. Routines in this group can return the number or actual instances of keyword 410 that are either a parent or child of another instance of keyword 410. Person group 520 contains routines for identifying an instance of person 418 associated with a general segment or vice versa. The number or actual instances of person 418 can be returned that match first and/or last name search strings. Thesaural keyword group 522 contains routines that returns attribute information (e.g., ID or label for an instance of thesaural keyword 412). A search string can be compared against the label attribute in instances of thesaural keyword 412 to return the number or actual instances of thesaural keyword 412.

Instances of type 416 can be queried using type group 524 and type hierarchy group 526. Type group 524 contains routines that return attribute information (e.g., label and description attributes) for instances of type 416. Using other routines in this group, a search string can be compared against the label or description attribute in instances of type 416 to return the number or actual instances of type 416. The type hierarchy is queried using routines in type hierarchy group 526. Routines in this group can return the number or actual instances of type 416 that are either a parent or child of another instance of type 416.

The section entitled Browser-Indexing Server Interface Routines contains a more detailed discussion of the routines contained in each group. It should be apparent that other groups and routines can be included in interface 314 to query and retrieve data from a catalogue.

Browser

Figure 6:
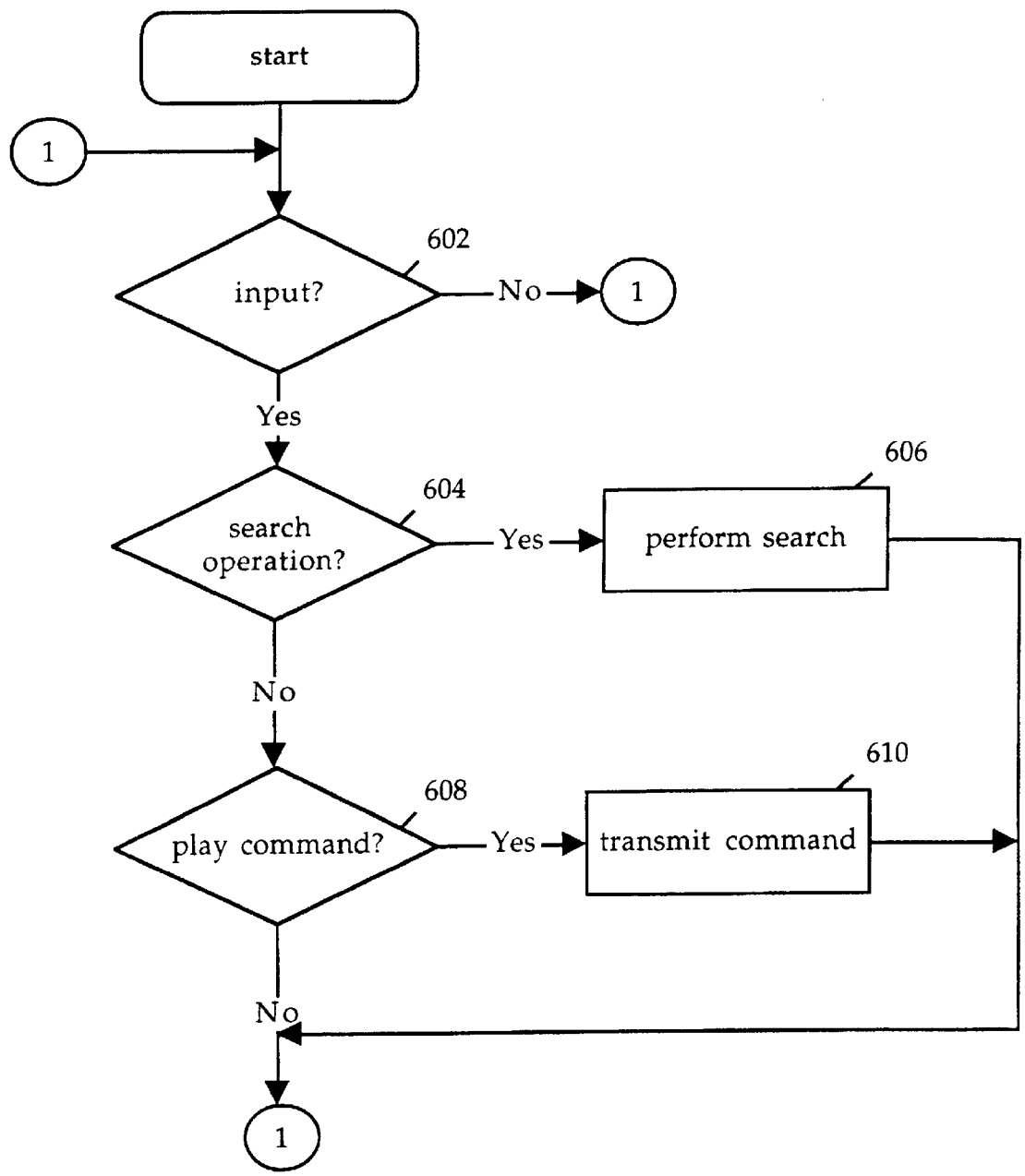
FIG. 6 provides a process flow for handling search and display operations according to an embodiment of the invention.

Browser 318 includes a user interface that includes display and input regions. Any user interface can be used with browser 318. For example, a graphical user interface can be provided that displays values associated with instances of type 416 and/or keyword 410. Using the interface, a user can enter search criteria (e.g., a search string) that can be used to identify instances of type 416 or keyword 410. The instances selected based on the search criteria can be displayed in the user interface for review. A drag and drop capability can be used with the user interface to drag criteria into a search string. In addition to a user interface for entering search criteria, browser 318 includes a user interface for displaying the multimedia data identified in a search operation. Browser 318 processes search input and multimedia display operations. FIG. 6 provides a process flow for handling search and display operations according to an embodiment of the invention.

At step 602 (i.e., "input?"), a determination is made whether input is received by browser 318. If not, processing continues at step 602 to wait for input. At step 604 (i.e., "search operation?"), a determination is made whether the input is a search operation. If it is, processing continues at step 606 to perform the search and returns to step 602 to accept other input. If the input is not a search operation, processing continues at step 608. At step 608 (i.e., "play command?"), a determination is made whether the display input is a play command (e.g., forward, reverse, fast forward, fast reverse, or jump). If it is, processing continues at step 610 to transmit the play command to archive server 306 and processing continues at step 602 to await other input. If it is not a play command, processing continues at step 602 to accept other input.

Perform Search

Figure 7A:
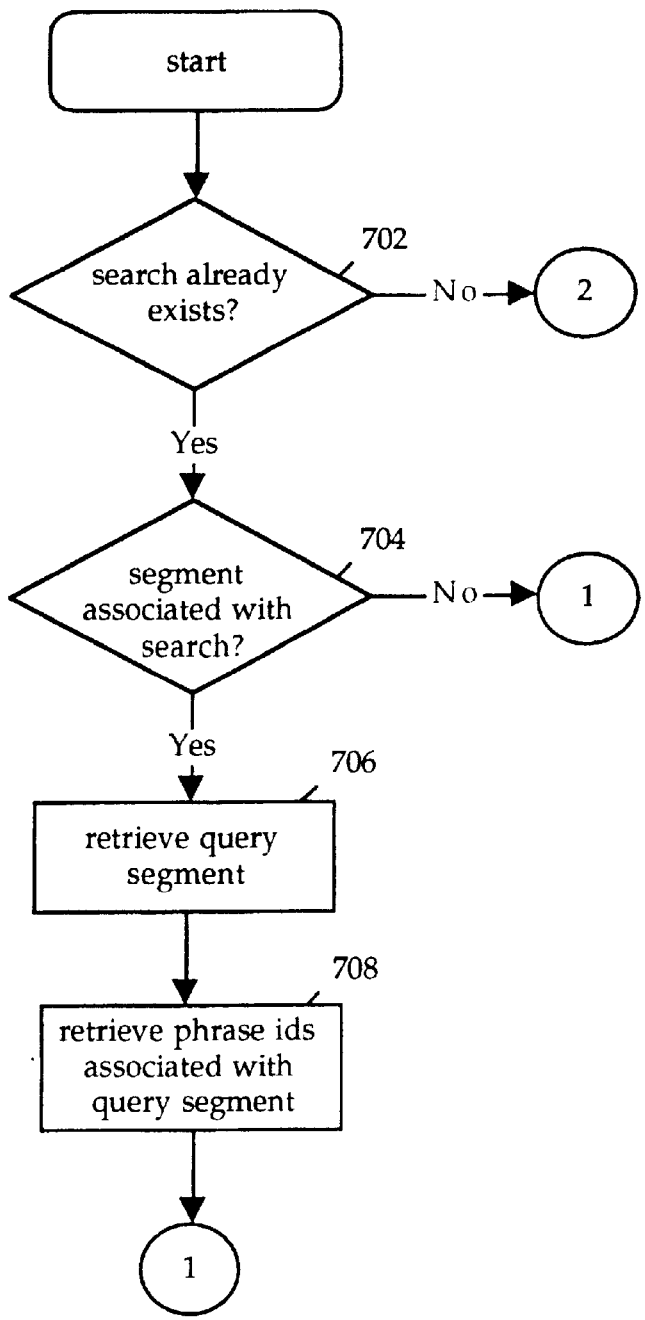
FIGS. 7A–7B provide a process flow for processing a search request according to an embodiment of the invention.
Figure 7B:
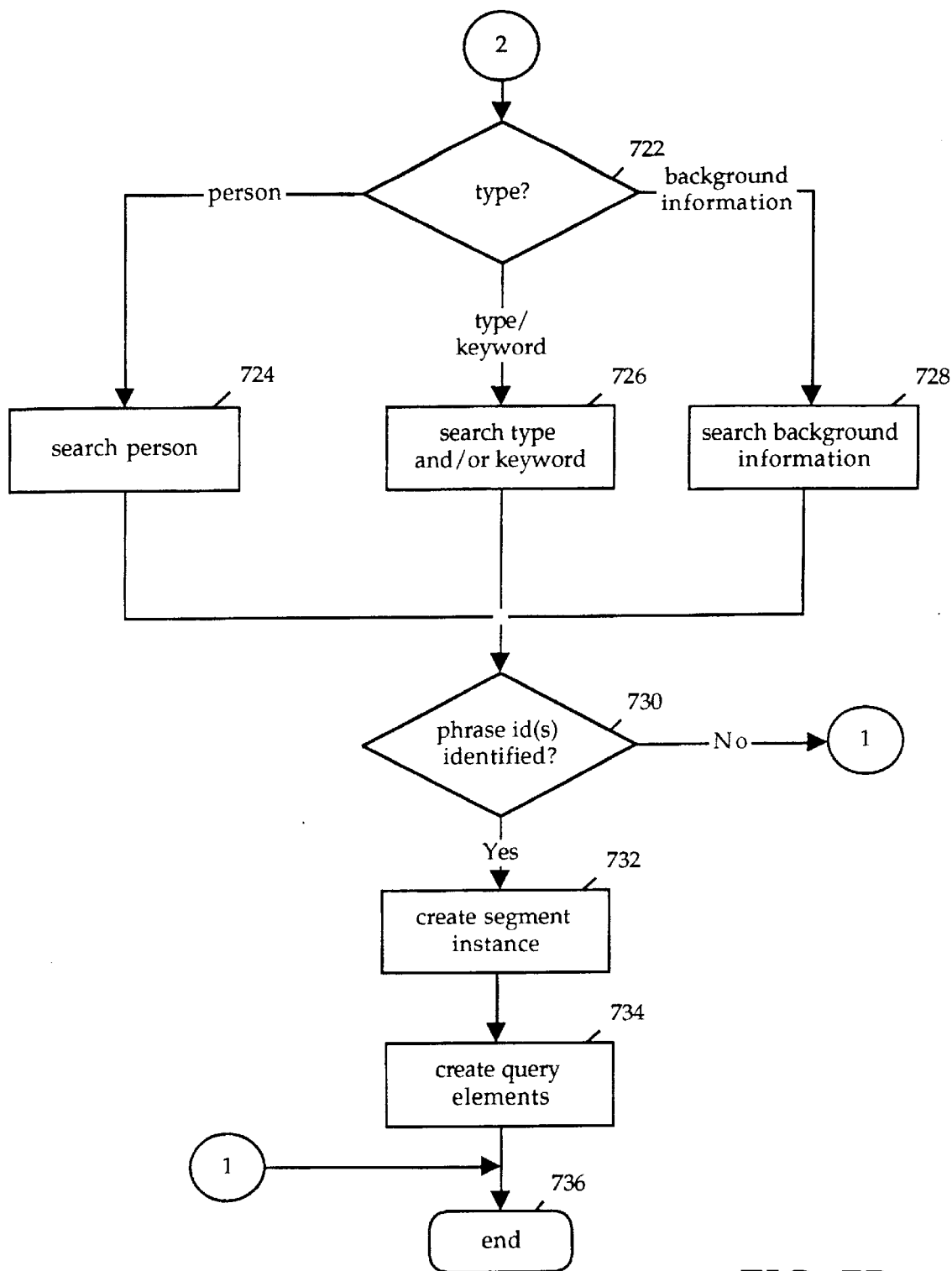

At step 606 of FIG. 6, browser 318 performs a search based on a determination (in step 604) that the input is a search request. FIGS. 7A–7B provide a process flow for processing a search request according to an embodiment of the invention.

The invention stores previous searches and the results of the previous searches. The results of a search form a sub-catalogue, or collection of catalogue elements. Thus, when a search is entered, processing determines whether the search has already been performed. If so, the search results are retrieved. Therefore, there is no need to repeat a search. If the search is a new search, browser 318 performs the search. When search input is received, browser 318 determines whether a the type of search requested and initiates the search.

At step 702 (i.e., "search already exists?"), a determination is made whether the search specified in the input already exists. If the search already exists, processing continues at step 704 to identify the instance of segment 404 that was created for the search. If no instance of segment 404 is found, processing ends at step 736. If an instance of segment 404 is found, processing continues at step 706 to retrieve it. At step 708, the instances of phrase 406 associated with the segment instance are identified (e.g., the associated phrase ids are retrieved from indexing server 316 using GEt_Phrases_In_Segment routine in segment group 512 of interface 314). Processing ends at step 736.

If it is determined at step 702 that the search has not already been performed, processing continues at step 722 to perform the search. At step 722 (i.e., "type?"), the type of search is determined by browser 318. The type of search can be determined, for example, from the selections made by the user when specifying the search criteria. A person search can be invoked by selecting a "search for person" control button and entering a person's name, for example. If it is a search of the instances of person 418, processing invokes a search person flow at step 724. If it is determined that a type or keyword search is specified, processing continues at step 726 to invoke a type/keyword search. If it is determined at step 722 that the search involves a search of instances of person information 426, processing continues at step 728 to invoke a search of instances of person information 426.

A search invoked in steps 724, 726, or 728 can return a set of phrase ids (none or more phrase ids). A determination is made at step 730 (i.e., "phrase id(s) identified?"), whether the search operation yielded any instances of phrase 406. If not, processing ends at step 736. If so, processing continues at step 732 to create a segment instance. Instances of relationship 428 are formed between the segment instance and the instances of phrase 406 identified in the search operation. At step 734, the search criteria is stored in query elements. These elements can be queried in a subsequent invocation of this process flow (at step 702) to determine whether the search already exists. Search elements are discussed in more detail in the section entitled Search Elements and Objects. Processing ends at step 736.

Type or Keyword Search

Figure 8A:
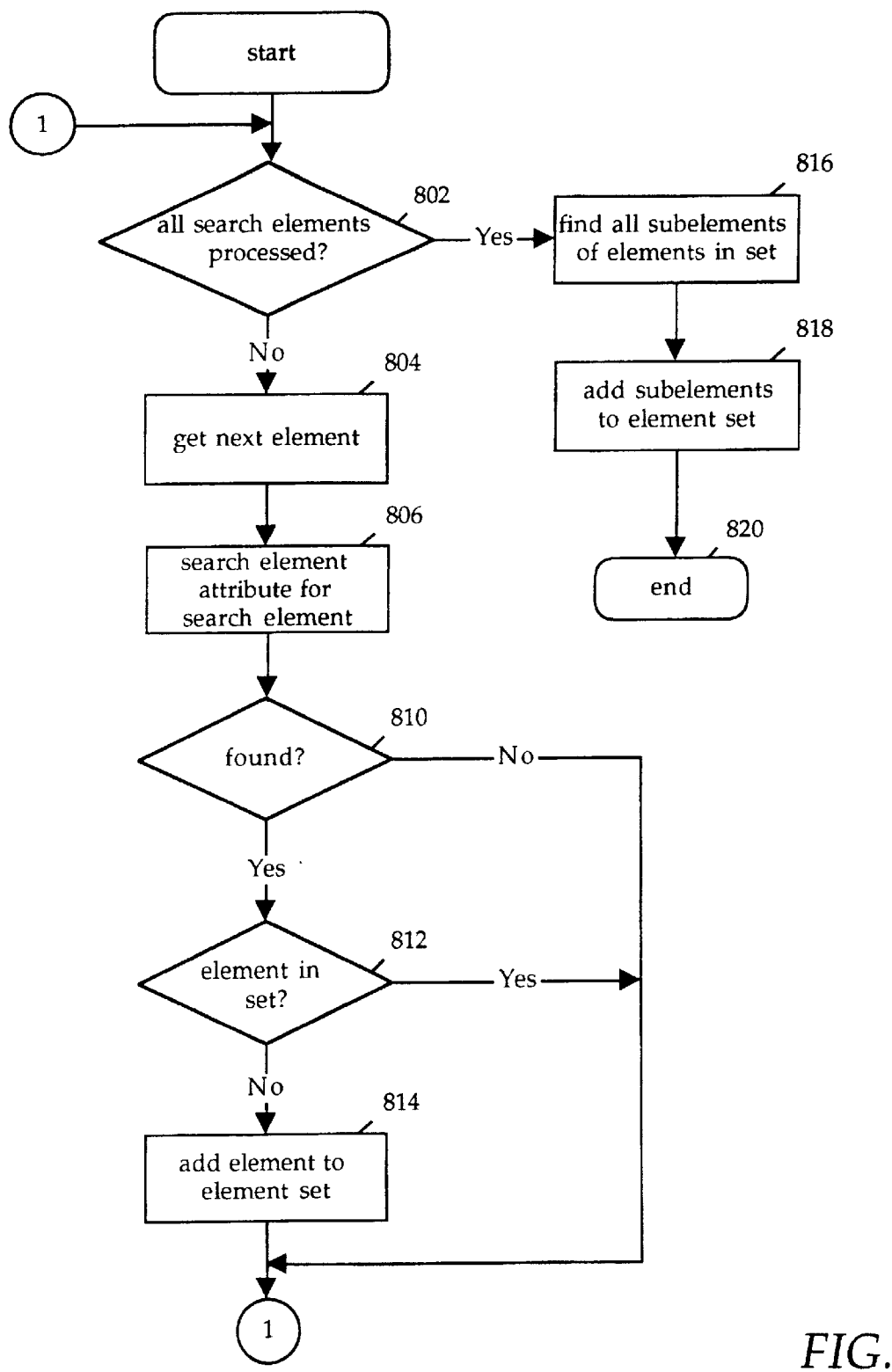
FIGS. 8A–8B provide a type and keyword search process flow according to an embodiment of the invention.
Figure 8B:
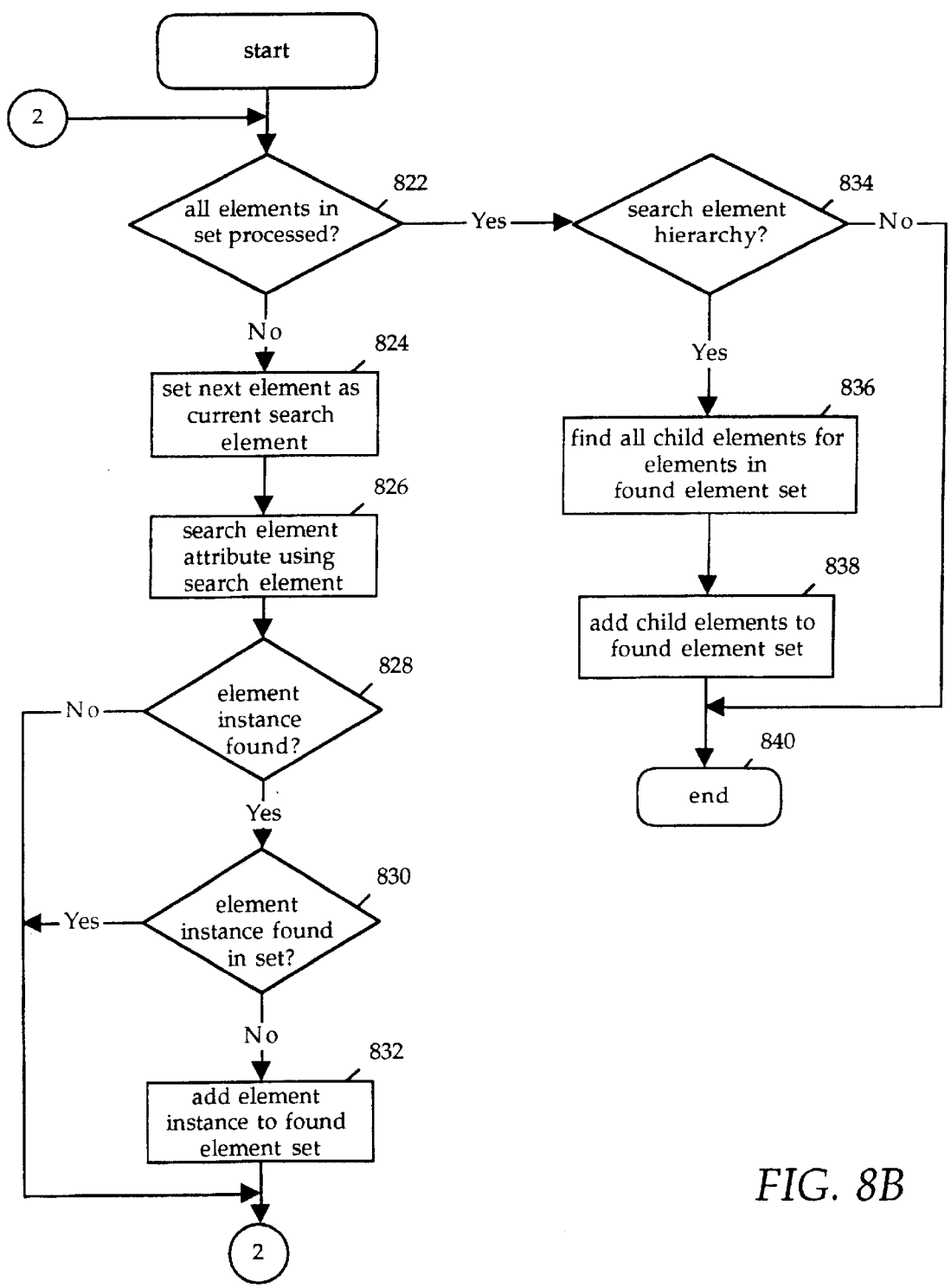

In addition to a person search, browser 318 can perform a type and/or keyword element search. If browser 318 determines at step 722 of FIG. 7B that the search operation is a type or keyword element search, browser 318 invokes the search. FIGS. 8A–8B provide a type and keyword search process flow according to an embodiment of the invention.

The search request identifies the search criteria used to identify the instances of type 416 or keyword 410 (e.g., the search input specifies values for the label attributes of type 416 or keyword 410). Browser 318 can be used to display instances of type 416 and/or keyword 410. A drag and drop facility can be used to drag an instance into the search. A conjunction (e.g., "and" or "or") can be selected to combine more than one instance. Each instance of a type 416 or keyword 410 that is dragged into a search represents an element of the search. Each element of the search criteria is processed to identify the instances of type 416 or keyword 410 that satisfy the search request. At step 802 (i.e., "all search elements processed?"), a determination is made whether all of the search elements have been processed. If not processing continues at step 804 to get the next element of the search criteria (e.g., a potential label attribute value). At step 806, the search element is compared against the corresponding attribute (e.g., label attribute) of the element instances being searched (i.e., instances of type 416 or keyword 410).

At step 810 (i.e., "found?"), a determination is made whether any element instances were found to match the search element, or criteria. If not, processing continues at step 802 to process any remaining search elements. If element instances were found (e.g., one or more instances of keyword 410 met the criteria specified in the current search element), processing continues at step 812 to determine whether the element instances are already contained in a set of found element instances. If so, processing continues at step 802 to process any remaining search elements. If not, processing continues at step 814 to add the element instances to the search set and processing continues at step 802 to process any remaining search elements.

If it is determined at step 802 that there are no more search elements, processing continues at step 816 to identify element instances contained in a hierarchy of element instances (e.g., subtypes of instances of type 416 or child instances of keyword 410). At step 816, element instances that are child instances of the element instances contained in the search set are identified. At step 818, the child instances are added to the search set, if they are not already contained in the set. Processing ends at step 820.

Related Keyword/Type Search

Relationship 444 exists between keyword 410 and type 416 (see FIG. 4B). Relationship 444 can be used to identify a second search set using the search set created in FIG. 8A. Using relationship 444, a set of keyword instances can be identified from a set of types and vice versa. For example, if the search operation performed in FIG. 8A yielded a search set that contains one or more instances of type 416, relationship 444 can be queried to obtain a set of instances of keyword 410 associated (via instances of relationship 444) with instances of type 416 contained in the search set. Similarly, instances of type 416 can be identified, using relationship 444, from a search set created in FIG. 8A that contains instances of keyword 410. FIG. 8B contains a process flow for creating a second search set using the search set containing instances of type 416 or keyword 410 and relationship 444.

At step 822 (i.e., "all elements in set processed?"), a determination is made whether all of the element instances in the search set are processed. If not, processing continues at step 824 to get the next element instance (e.g., an instance of type 416 or keyword 410). At step 826, the element instance associated with the current element instance via relationship 444 is located. For example, an instance of keyword 410 is identified that is associated (via an instance of relationship 444) with an instance of type 416 in the search set. Or, an instance of type 416 is identified that is associated with an instance of keyword 410 in the search set.

At step 828 (i.e., "element instance found?"), a determination is made whether the element instance is found in step 826. If not processing continues at step 822 to process any remaining search set element instances. If so, processing continues at step 830 (i.e., element instance found in set?"), to determine whether the related element instance already exists in the related element search set being created. If so, processing continues at step 828 to process any remaining search set elements. If it does not already exist in the related element search set, processing continues at step 832 to add the related element to the related element search set. Processing continues at step 822 to process any remaining elements in the search set.

If it is determined at step 822 that all elements in the search set have been processed, processing continues to search the related elements' element hierarchy (e.g., the type hierarchy, if the related element search set contains instances of type 416). At step 836, element instances that are child instances of the related element instances contained in the related element search set are identified. At step 838, the child instances are added to the related element search set, if they are not already contained in the set. Processing ends at step 840.

Figure 8C:
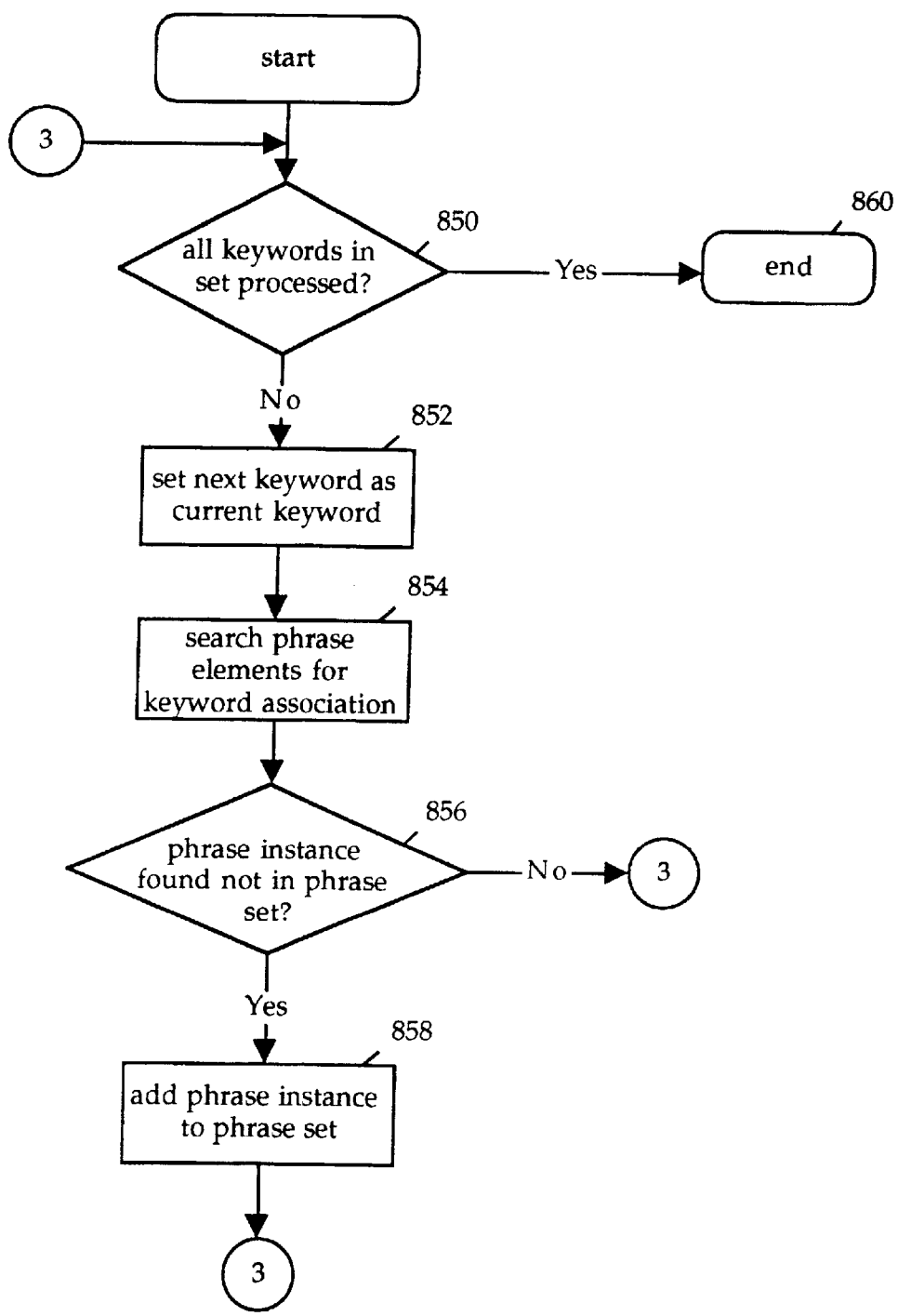
FIG. 8C provides a process flow for identifying instances of phrase 406 that are associated with instances of keyword 410 contained in a search set created by a search operation according to an embodiment of the invention.

The process flows of FIGS. 8A–8B can yield instances of keyword 410. A set of keyword instances can be used to identify a set of catalogue elements (e.g., phrase 406) that can be used to reference the multimedia data. FIG. 8C provides a process flow for identifying instances of phrase 406 that are associated with instances of keyword 410 contained in a search set created by a search operation according to an embodiment of the invention.

At step 850 (i.e., "all keywords in set processed?"), a determination is made whether there are any instances of keyword 410 that remain to be processed. If not, processing ends at step 860. If so, processing continues at step 852 to get the next instance of keyword 410 in the search set. At step 854, a search is performed to identify instances of phrase 406 that are related (via relationship 430) to the current instance of keyword 410. For example, Get_Phrases_In_Testimony Keyword can be called in keyword group 516 of interface 314 for each testimony instance. At step 856 (i.e., "phrase instance found not in phrase set?"), a determination is made whether the instances of phrase 406 identified in step 852 already exist in the set of phrases. If so, processing continues at step 850 to process any remaining keyword instances. If not, processing continues at step 858 to add the phrase instance(s) found in step 854 in the set of phrases. Processing continues at step 850 to process any remaining keyword instances.

Person Information Search

Figure 9:
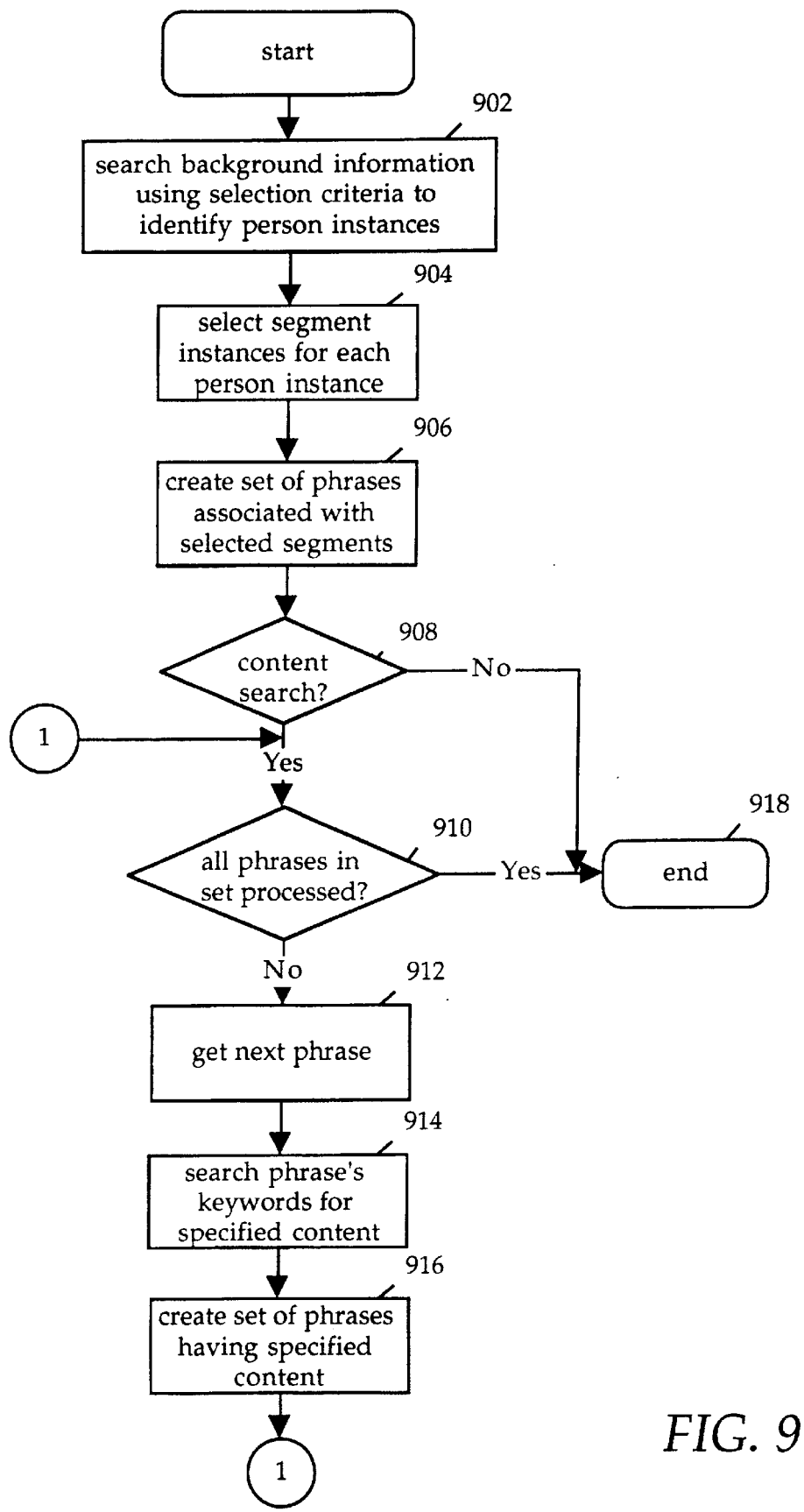
FIG. 9 provides a person information search process flow according to an embodiment of the invention.

Person information 426 contains attribute information for instances of person 418. For example, person information 426 can contain birth date and place attribute information for an instance of person 418. A search operation can be performed on person information 426 to identify instances of person 418 having certain attributes. An instance of person 418 can be associated with an instance of segment 404 (e.g., a general segment) via relationship 432. The instance of segment 404 associated with the instance of person 418 can be used to identify the instances of phrase 406 contained within the segment instance. Further, an instance of person 418 can be used to identify associated instances of phrase 406 (using relationship 430). FIG. 9 provides a person information search process flow according to an embodiment of the invention.

At step 902, instances of person information 426 are examined using the selection criteria to identify those instances that satisfy the criteria. The instances of person information 426 identified can then be used to identify their associated (via relationship 436) instances of person 418. Instances of person 418 are associated with instances of segment 404 (e.g., via relationship 432) At step 904, relationship 432 can be used to identify instances of segment 404 associated with the selected instances of person 418. At step 906, the instances of phrase 406 contained within the instances of segment 404 are identified and used to create a phrase set.

At step 908 (i.e., "content search?"), a determination is made whether the keyword hierarchy should be searched to identify associated instances of phrase 406 having the desired content. For example, the search criteria includes a keyword element. If not, processing ends at step 918. If so, processing continues at step 910. At step 910 (i.e., "all phrases in set processed?"), a determination is made whether all of the instances of phrase 406 in the phrase set have been processed. If they have, processing ends at step 918. If not, processing continues at step 912 to get the next instance of phrase 406 in the phrase set. At step 914, the instances of keyword associated with the current instance of phrase 406 are examined to determine whether a content criteria specification is met. At step 916, a second phrase set is created that contains the instances of phrase in the first phrase set that satisfy the content specification. Processing continues at step 910 to process any remaining phrases.

Person Search

Figure 10A:
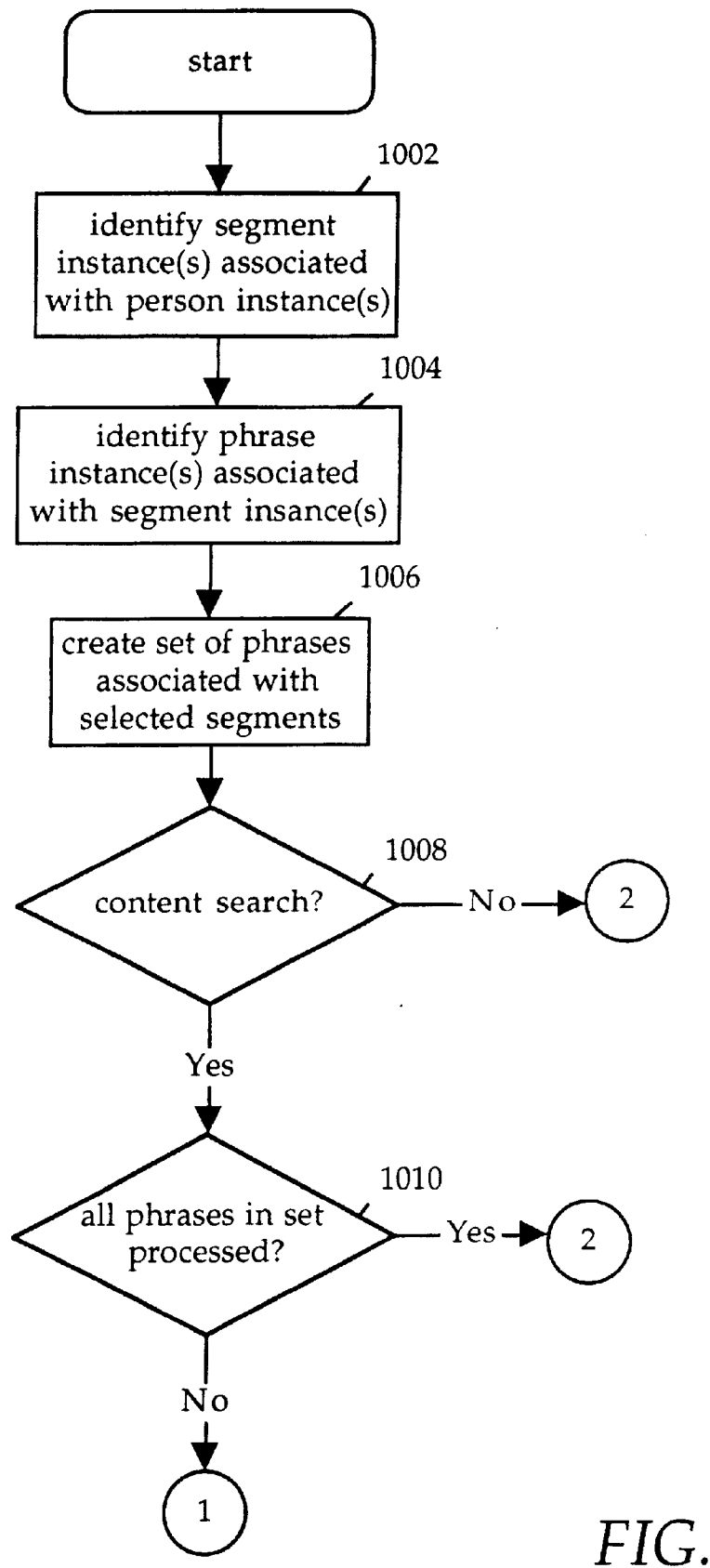
FIGS. 10A–10B provide a person search process flow according to an embodiment of the invention.
Figure 10B:
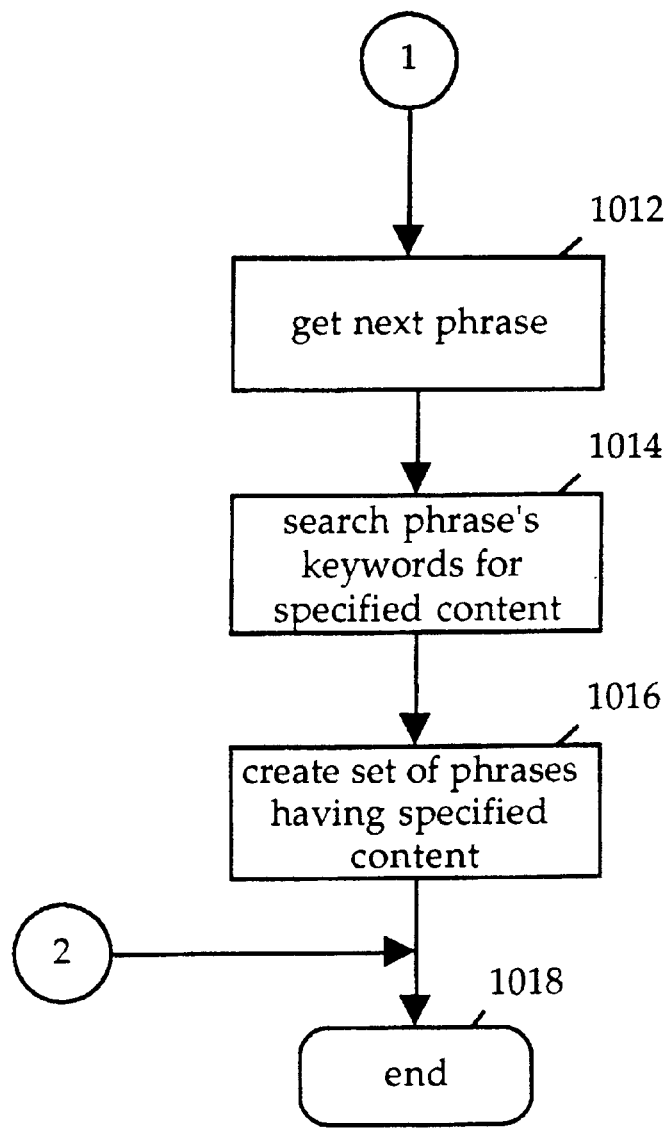

As previously discussed, an instance of person 418 can be used to identify instances of phrase 406 via segment 404 (and relationships 432 and 428) or via relationship 430. FIGS. 10A–10B provide a person search process flow according to an embodiment of the invention.

At step 1002, the instances of person 418 are examined using the selection criteria to identify those instances that satisfy the criteria. The instances of person 418 identified in step 1002 can then be used to identify their associated (via relationship 432) instances of segment 404. Segment 404 can be used to identify the instances of phrase 406 contained in segment 404. At step 1004, the instances of phrase 406 contained within the instances of segment 404 are identified and used to create a phrase set at step 1006.

At step 1008 (i.e., "content search?"), a determination is made whether the keyword hierarchy should be searched to identify associated instances of phrase 406 having the desired content. If not, processing ends at step 1018. If so, processing continues at step 1010. At step 1010 (i.e., "all phrases in set processed?"), a determination is made whether all of the instances of phrase 406 in the phrase set have been processed. If they have, processing ends at step 1018. If not, processing continues at step 1012 to get the next instance of phrase 406 in the phrase set. At step 1014, the instances of keyword associated with the current instance of phrase 406 are examined to determine whether a content criteria specification is met. At step 1016, a second phrase set is created that contains the instances of phrase in the first phrase set that satisfy the content specification. Processing continues at step 1010 to process any remaining phrases.

Search Elements and Objects

Query elements and objects are used to facilitate search operations. They retain information about a search. Preferably, the information retained is, for example, the search criteria and the search results. The criteria that is retained for a search can be used to compare against criteria specified for a subsequent search. If a match is found, the retained search results can be used to satisfy the current search. Thus, there is no need to duplicate a search. Query relations are stored on indexing server 316 in addition to the catalogue and attribute elements to retain search criteria. In addition, an instance of segment 404 is created to retain the results of a search. FIG. 11 illustrates elements and element relationships for processing and retaining search requests according to an embodiment of the invention.

Segment 404, phrase 406, keyword 410, type 416, person 418, and person information 426 are the same as the same numbered elements provided in FIGS. 4A–4C. With one exception, the relationships between these elements are the same as those provided in FIGS. 4A–4C. Relationship 1124 between keyword 410 and segment 404 is a combination of relationships 428 and 430.

Figure 11A:
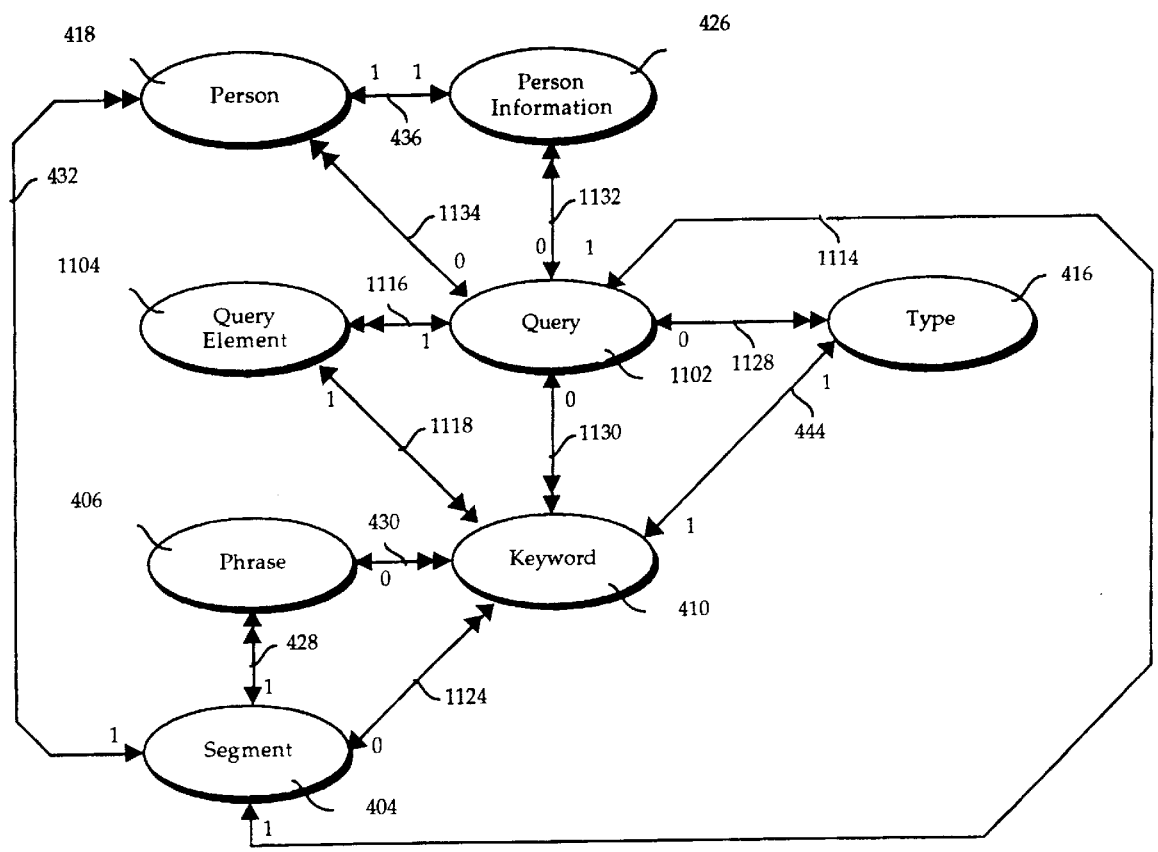
FIGS. 11A–11B illustrate search elements, relationships, and attributes used to process and retain search requests according to an embodiment of the invention.

In addition to these elements, FIG. 11A contains query 1102 and query element 1116. Query 1102 is created for each search. An instance of query element 1104 is created for each element of a search (e.g., a keyword or type criteria element entered using the browser's user interface). For example, a search may identify two instances of keyword 410 as part of the search criteria. Each instance is a search element. An instance of query element 1104 is created for each of these search elements.

The relationships between the search elements and other elements is illustrated in FIG. 11A. Query 1102 can include at least one instance of either type 416 (relationship 1128), keyword 410 (relationship 1126), person information 426 (relationship 1132), or person 418 (relationship 1134). An instance of query 1102 can consist of multiple instances of these four elements. A search element of query 1102 is an instance of one of these four elements. Each search element is retained in an instance of query element 1116. Query 1102 is related via relationship 1116 to one or more instances of query element 1104. That is, query 1102 can contain one or more instances of query element 1116.

Figure 11B:
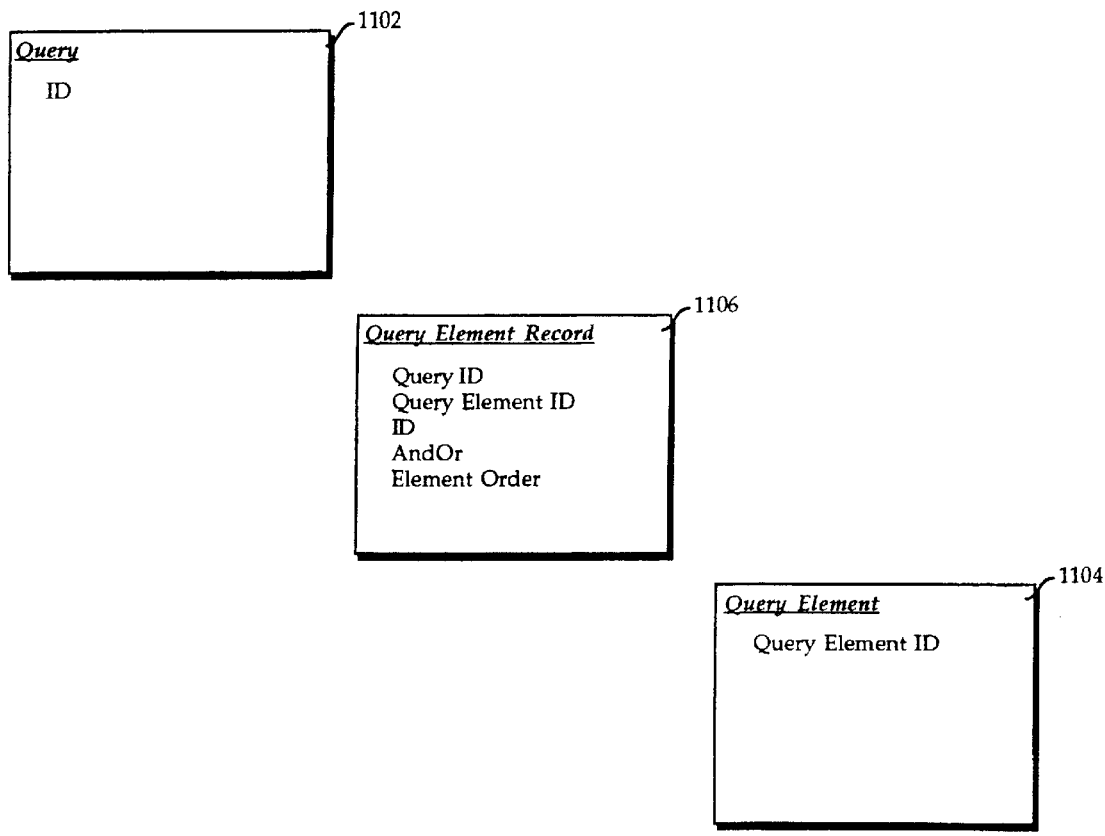

FIG. 11B illustrates attributes for query 1102, query element 1104 and a relationship between them (i.e., query element record 1106). Query 1102 contains an identifier (ID). Query element 1104 contains an identifier (ID). Query 1102 and query element 1104 are related via relationship 1116 (see FIG. 11A). Relationship 1116 is implemented using query element record 1106. Query element record 1106 contains the identifier for the associated query 1102 and query element 1104. In addition, query element record 1106 includes an identifier.

Attributes of query element record 1106 store the cardinal and conjunctive information for its associated instance of query element 1104. Conjunctivity is retained in the "AndOr" attribute. Cardinality is stored in the element order attribute. Thus, a search can be reconstructed by collecting all of the associated instances of query element record 1106 and query element 1104. The order and relationship of each search element can be determined from each instance of query element record 1106.

Thus, the criteria for a search can be recreated and compared to a new set of search criteria. If a match is found, the instance of query 1102 associated with the match can be used to find its associated instance of segment 404 (via relationship 1114). The instances of phrase 406 associated with the instance of segment 404 (via relationship 428) can then be identified. If a match is not found, a search can be performed to identify a new instance of segment 404 and its associated instances of phrase 406.

Instances of phrase 406 can be sent to archive server 306 for retrieval from storage and playback. The following section discusses the retrieval and playback of data associated with instances of phrase 406.

Multimedia Data Retrieval and Play

Figure 12:
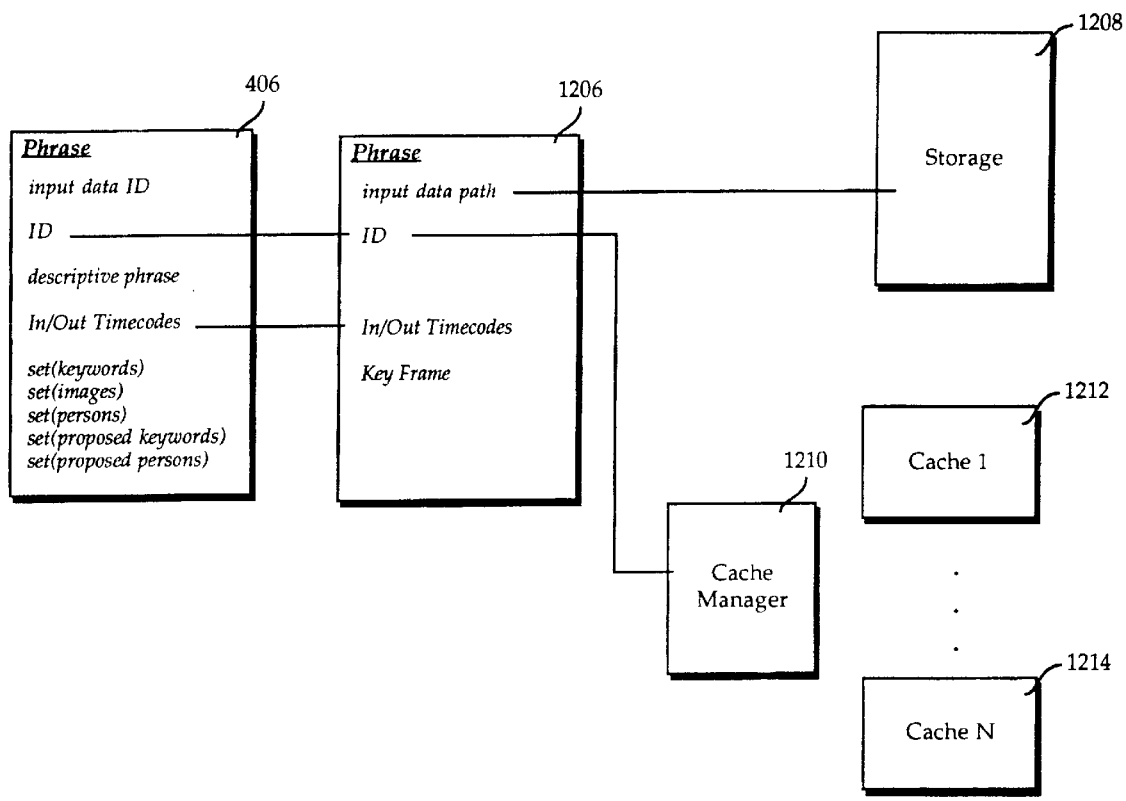
FIG. 12 illustrates use of the phrase element to access multimedia data in accordance with an embodiment of the invention.

Archive server 306 tracks the location of the multimedia data such that it can identify the instance of tertiary storage manger 304 that manages the data. Archive server 306 tracks the location of the multimedia data such that it can be retrieved when requested by browser 318. Phrase 406 is used by both browser 318 and archive server 306 to identify a piece of multimedia data. FIG. 12 illustrates use of the phrase element to access multimedia data in accordance with an embodiment of the invention.

Phrase 406 is an attribute element that is associated with a portion of multimedia data. Phrase 406 has ID and timecode attributes. A corresponding instance of phrase is maintained by archive server 306, i.e., phrase 1206. Phrase 1206 has an ID that corresponds with the ID of its counterpart instance of phrase 406. Similarly, the timecode attributes of phrase 1206 correspond to the timecode attributes of phrase 406. In addition, phrase 1206 has a path attribute that points to the physical storage location of the portion of multimedia data associated with phrase 1206 (and 406).

The input data path attribute of phrase 1206 can be used to load the multimedia data from a storage device. Multimedia data is permanently stored in storage 1208 (e.g., a tape system such as a provided by EMASS). In addition, the invention uses one or more instances of cache to temporarily store the multimedia data. Cache manager 1210 manages one or more caches (cache 1 through cache N). Cache 1–N are one terabyte (Tb) caches, for example.

Figure 13A:
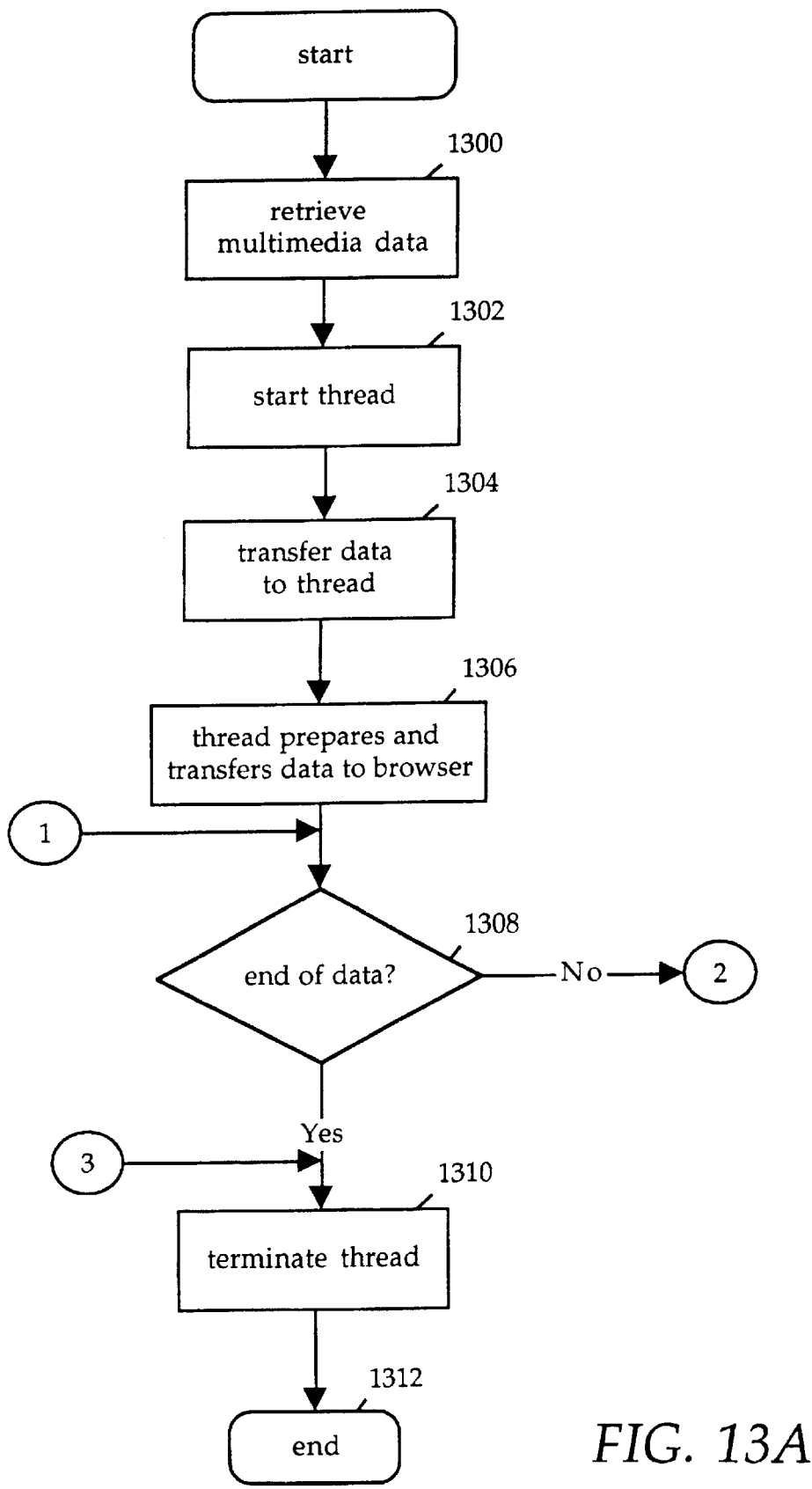
FIGS. 13A–13B provide a process flow for handling a play command invocation received from a browser according to an embodiment of the invention.
Figure 13B:
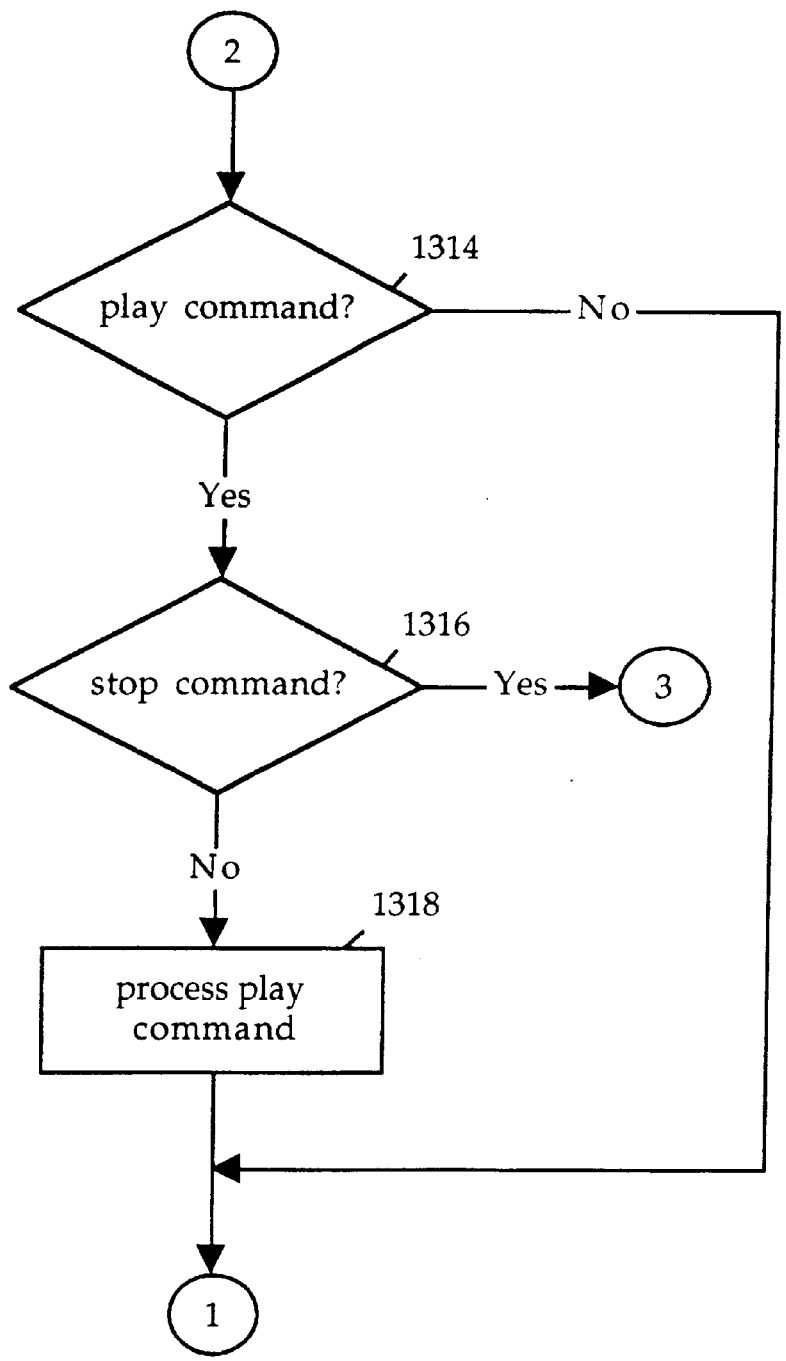

Before browser 318 sends a play command to method player 302, it sends a set of phrase IDs to archive server 306. Archive server 306 uses the phrase IDs to identify the multimedia data requested for play. Archive server 306 determines the location (e.g., storage 1208 or cache 1 through cache N) of the data using the phrase IDs and interfaces with the instance of tertiary storage manger 304 that manages the store. FIGS. 13A–13B provide a process flow for handling a play command invocation received from a browser according to an embodiment of the invention.

At step 1300, archive server 306 determines the location of the data and requests the appropriate instance of tertiary storage manager 304 to retrieve the multimedia data from a storage location. At step 1302, a thread (e.g., an instance of method player 302) is forked to play the data on browser 318. At step 1304, the data is transferred by tertiary storage manager 304 to the spawned thread. At step 1306, the spawned thread prepares the data (e.g., decompresses and renders the data) and transfers it to browser 318. At step 1308 (i.e., "end of data?"), a determination is made whether there is any data remaining to be played. If there is no more data, processing continues at step 1310 to stop play and terminate the player thread. Processing ends at step 1312.

If it is determined at step 1308 that data remains to be played, processing continues at step 1314. During play, a user can initiate a play command such as forward, reverse, fast forward, fast reverse, or jump. The jump command provides the ability to jump to a particular frame in the multimedia data. At step 1314 (i.e., "play command"), a determination is made whether a play command has been received from the user. If not, processing continues at step 1308 to determine whether any data remains to be processed. If it is determined that a play command has been received, processing continues at step 1316.

At step 1316 (i.e., "stop command?"), a determination is made whether a stop command was received. If so, processing continues at step 1310 to terminate the player and end processing. Otherwise, processing continues at step 1318 to process the play command and then processing continues at step 1308 to play any remaining data. As previously indicated, a play command can change the direction or speed of play, for example. In this case, the player performs the requested change. A fast forward command is processed by doubling the rate at which the data is played, for example.

A jump command is a play command that moves the play point to another phrase within a sequence of phrases. When a jump command is specified, it includes a phrase ID that can be used to identify the jump location within the phrase sequence. The player stops play and uses the phrase ID to identify the point in the sequence (i.e., phrase) that corresponds with the phrase ID. When play resumes, the phrase identified by the jump location is displayed. Thus, a jump command positions the player at a specified phrase, so that subsequent play, forward, reverse, fast forward, and fast reverse operations begin at the first frame of the phrase.

Asset Management Objects

Figure 14:
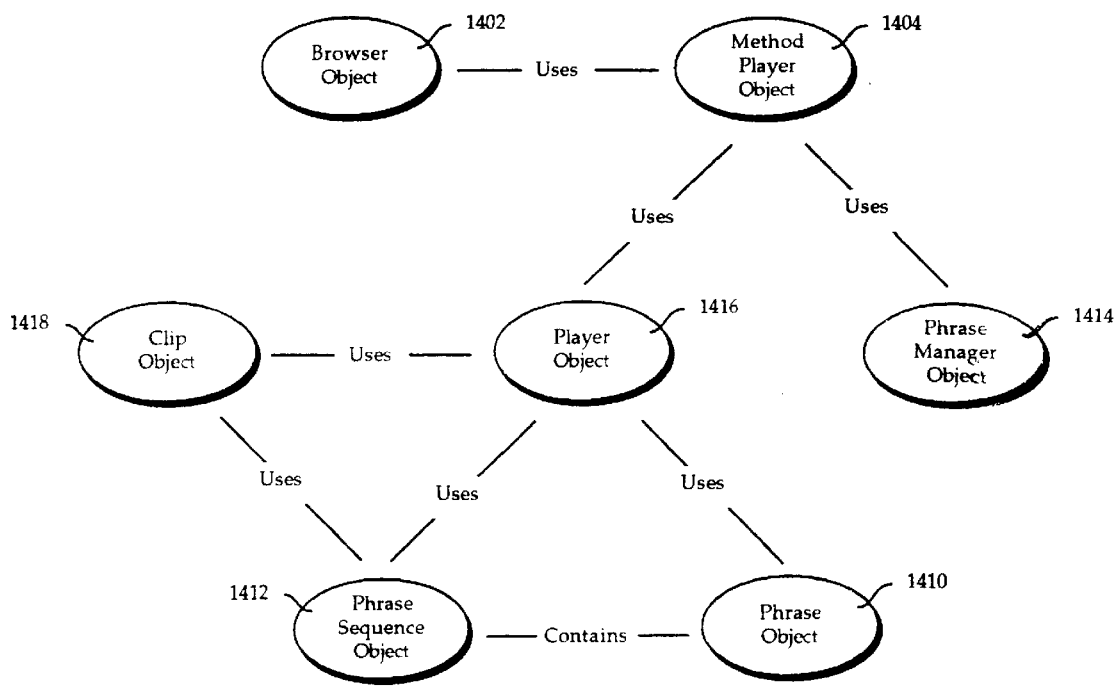
FIG. 14 provides an example of asset management objects according to an embodiment of the invention.

The functionality discussed above can be implemented in one or more objects. FIG. 14 provides an example of objects that can be used to perform asset management functionality.

Browser object 1402 encapsulates those operations that method player 302 performs on browser 318. Browser object 1402 is a mechanism for method player 302 to notify browser 318 of interesting or exceptional events. Browser object 1402 can provide a method that can be called for each event, for example. Method player object 1404 encapsulates the functionality that browser 318 requires to play an instance of phrase 406 or a sequence of phrase instances. Method player object 1404 is an object factory for other objects, such as player object 1406 and phrase manager object 1408. Preferably, there is only one instance of method player object 1404 active for an instance of browser 318.

Phrase object 1410 is associated with an instance of phrase 406. Phrase object 1410 contains state information for an instance of phrase 406 such as the start and end time code relative to the original tape and is uniquely identified by a phrase ID. When an instance of phrase object 1410 is constructed, the data associated with the phrase is retrieved from storage 1208. Phrase object 1410 includes one or more methods to locate (and/or extract) its associated data. A request for cached data is processed by an instance of phrase object 1410. Phrase object 1410 includes a method to play its associated data and to process play commands (e.g., play, stop, forward, reverse, fast forward, fast reverse, etc.).

Phrase sequence object 1412 represents a sequence of phrases, that like a phrase object 1410, knows how to play itself on a player. Further, it has the ability to handle play commands. Additionally, phrase sequence 1412 provides one or more methods to process a jump command. A jump operation positions the sequence of phrases associated with an instance of phrase sequence object 1412 at the first frame of a specified phrase in the sequence.

Phrase manager object 1414 is responsible for instantiating instances of phrase object 1410 and phrase sequence object 1412 using the phrase IDs provided by browser 318. Further, phrase manager object 1414 tracks instances of phrase object 1410 and phrase sequence object 1412 and prohibits their data from being purged from cache if the data is currently in use.

Player object 1416 encapsulates the operations of a movie player. Instances of phrase object 1410 and/or phrase sequence object 1412 use player object 1416 to play themselves in a region on a display of browser 318. Player object 1416 provide a mechanism for phrase object 1410 or phrase sequence object 1412 to produce a bit stream in a format that it can play. Player object 1416 consumes the data by decoding and playing it into a display region. Player object 1416 may utilize special hardware to accomplish this such as the Optivision's MPEG decoder). Player object 1416 is created by method player object 1404.

FIG. 14 further illustrates use relationship that exist between the asset management objects. An instance of browser object 1402 uses an instance of method player object 1404. Method player object 1404 can use an instance of player object 1416 and phrase manager object 1414. Phrase sequence object 1412 contains n instances of phrase object 1410. Phrase object 1410 can use an instance of player object 1416. Phrase sequence object 1412 can use an instance of player object 1416.

A clip object 1418 provided by an object instance provides data that can be played by an instance of player object 1416. Further, clip object 1418 can serve as a producer of movie data for an instance of player object 1416. Clip object 1418 specifies its associated instance of player object 1416 and the display region(s) and frame rate for play. In addition, clip object 1418 provides operations to begin playing a clip on an instance of player object 1416 from the current position, to stop play progression and display the current frame as a still in the display region, to initiate forward progression from a current position at a specified frame rate, to reverse play from the current position at a specified frame rate, to fast forward play at twice the specified frame rate, and to fast reverse play at twice the specified frame rate.

Phrase object 1410 is a subclass of clip. Phrase sequence is also a subclass of clip object 1418. Phrase sequence object 1412 uses state information from clip object 1418 when a jump operation is performed. If clip object 1418 is in a "stopped" state when a jump operation is performed, the first frame of the sequence of phrases for the phrase sequence object 1412 is displayed in the display region. If clip object 1412 is in a "playing" state, play jumps to the first frame of the phrase that is being played and continues playing at that point. If clip object 1412 is in a "fast forward" state, play jumps to the first frame of the current phrase and enters a "playing" state. If clip object 1412 is in a "fast reverse" state, play jumps to the first frame of the current phrase and enters a "playing" state.

Browser and Indexing Server Interface Routines

The following identifies examples of routines contained in interface 314. Other routines can be used to replace or supplement some or all of the routines provided below.

```
Testimony (or File) Routines
    Get_Number_Phrases_In_Testimony(int testimony)
        Returns the number of phrases in a testimony.
        SQL:  Select count (*)
              From Phrase
              TestimonyID = testimony
    Get_Phrases_In_Testimony(int testimony, set phrases)
        Returns the set of phrases in testimony.
        SQL:  Select PhraseID
              From Phrase
              TestimonyID = testimony
    Get_PhraseStruct_In_Testimony(int testimony_id, int
phrase_id, PHRASE*P)
        Returns the phrase structure identified by PhraseID, in
        TestimonyID.
        SQL:  Select TestimonyID, PhraseID, InTimeCode,
              OutTimeCode,
              From Phrase
              Where TestimonyID = testimony
              And PhraseID = phrase
    Get_Number_Segments_In_Testimony(int testimony)
        Returns the number of segments in a testimony.
        SQL:  Select count (*)
              From PhraseCollection
              TestimonyID = testimony
    Get_Segments_In_Testimony(int testimony, set segments)
        Returns the set of phrases in a testimony.
        SQL:  Select SegmentID
              From PhraseCollection
              TestimonyID = testimony
    Get_Number_Segments_In_CollectionType(int coll_type)
        Returns the number of segments of a collection type.
        SQL:  Select count (*)
              From Segment
              Where CollectionTypeID = coll_type
    Get_Segments_In_CollectionType(int coll_type, set segments)
        Returns the set of a given collection type
        SQL:  Select SegmentID
              From Segment
              Where CollectionTypeID = coll_type
    Get_Number_Keywords_In_Testimony(int testimony)
        Returns the number of Keywords in a testimony.
        SQL:  Select count (*)
              From KeywordPhraseRecord
              TestimonyID = testimony
    Get_Keywords_In_Testimony(int testimony, set*keywords)
        Returns the set of keywordIDs in a testimony
        SQL:  Select Keyword ID
              From KeywordPhraseRecord
              Where TestimonyID = testimony
    Get_Number_Thesaural_Keywords_In_Testimony(int
testimony)
        Returns the number of Theseaural Keywords in a testimony
        SQL:  Select count (*)
              From ThesuaralKeyword
              TestimonyID = testimony
    Get_Thesaural_Keywords_In_Testimony(int testimony, set
*keywords)
        Returns the set of Thesautal keywordIDs in a testimony
        SQL:  Select ThesauralKeywordID
              From ThesauralKeyword
              Where TestimonyID = testimony
    Get_Number_Person_Keywords_In_Testimony(int
testimony)
        Returns the number of Person Keywords in a testimony.
        SQL:  Select count (*)
```

```
                    From PersonKeyword
                    TestimonyID = testimony
        Get_Person_Keywords_In_Testimony(int testimony,
        set*persons)
            Returns the set of person IDs in a testimony
            SQL:  Select PersonID
                    From PersonKeyword
                    Where TestimonyID = testimony
Segment Routines
    Get_Collection_Type_In_Segment(int segment)
        Returns the collection type of a segment.
        SQL:  Select CollectionTypeID
                From Segment
                Where SegmentID = segment
    Get_Segment_Description(int segment, char() description)
        Returns the segment description of a segment.
        SQL:  Select Seg_Desc
                From Segment
                Where SegmentID = segment
    Get_Number_Phrases_In_Segment(int segment)
        Returns the number of phrases in a segment.
        SQL:  Select count (*)
                From PhraseCollection
                Where SegmentID = segment
    Get_Phrases_In_Segment(int segment, set*phrases)
        Returns the set of PhrasesIDs in a segment
        SQL:  Select PhraseID
                From PhraseCollection
                And SegmentID = segment
    Get_Number_Keywords_In_Segment(int segment)
        Returns the number of Keywords in a segment.
        SQL:  Select count (*)
                From KeywordSegmentRecord
                Where SegmentID = segment
    Get_Keywords_In_Segment(int segment, set*keywords)
        Returns the set of keywordIDs in a segment
        SQL:  Select Keyword ID
                From KeywordSegmentRecord
                Where SegmentID = segment
    Is_String_In_Segment_Description(char*search, int segment,
    boolean AnyFlag)
        Returns the number of segments that a search string
        appears in the segment description.
        SQL:  (AnyFlag = 0)
                Select count (*)
                From Segment
                Where SegmentID = segment (see NOTE)
                And Seg_Desc LIKE 'search'
        SQL:  (AnyFlag = 1)
                Select count (*)
                From segment
                Where SegmentID = segment (see NOTE)
                And Seg_Desc LIKE '%search%'
    Get_Segment_In_Search_String(char*search, int any,
    set*segments)
        Returns the set of segments that a search string appears
        in the segment description.
        SQL:  AnyFlag = 0)
                Select SegmentID
                From Segment
                Any Seg_Desc LIKE 'search'
        SQL:  (AnyFlag = 1)
                Select SegmentID
                From Segment
                And Seg_Desc LIKE '%search%'
Phrase Routines
    Get_InTime_In_Testimony_Phrase(int testimony, int phrase,
    char*intime)
        Returns the InTimeCode of a phrase.
        SQL:  Select InTimeCode
                From Phrase
                Where TestimonyID = testimony
                And PhraseID -= phrase
    Get_OutTime_In_Testimony_Phrase(int testimony, int
    phrase, char*outtime)
        Returns the OutTimeCode of a phase.
        SQL:  Select OutTimeCode
                From Phrase
                Where TestimonyID = testimony
                And PhraseID = phrase
    Get_Number_Keywords_In_Testimony_Phrase(int testimony,
    int phrase)
        Returns the number of Keywords in a testimony, phrase.
        SQL:  Select count (*)
                From KeywordPhraseRecord
                Where TestimonyID = testimony
                And PhraseID = Phrase
    Get_Keywords_In_Testimony_Phrase(int testimony, int
    phrase, set*keywords)
        Returns the set of keywordIDs in a testimony, phrase.
        SQL:  Select KeywordID
                From KeywordPhraseRecord
                Where TestimonyID = testimony
                And PhraseID = phrase
    Is_String_In_Phrase_Description(char*search, int testimony,
    int phrase, boolean AnyFlag)
        Returns number of phrases where search string is
        contained in a phrase description.
        SQL:  (AnyFlag – 0)
                Select count (*)
                From Phrase
                Where TEstimonyID = testimony (see NOTE)
                And PhraseID = phrase (see NOTE)
                And Desc_Phrase = search
        SQL:  (AnyFlag = 1)
                Select count (*)
                From Phrase
                Where TEstimonyID = testimony (see NOTE)
                And PhraseID = phrase
                And Desc_Phrase = '%search%'
    Get_Phrase_In_Description_Search_String(char*search, int
    testimony, boolean AnyFlag, set*phrases)
        Returns set of phrases IDs where search string is
        contained in a phrase description. (see NOTE)
        SQL:  (AnyFlag = 0)
                Select count (*)
                From Phrase
                Where TEstimonyID = testimony
                And Desc_Phrase = search
        SQL:  (AnyFlag = 1)
                Select count (*)
                From Phrase
                Where TEstimonyID = testimony
                And Desc_Phrase = '%search%'
Keyword Routines
    Get_Type_In_Keyword(int keyword)
        Returns the TypeID of a keyword.
        SQL:  Select TypeID
                From Keyword
                Where KeywordID = keyword
    Get_Number_Authority_In_Keyword(int keyword)
        Returns the number of AuthorityIDs for a keyword.
        SQL:  Select count (*)
                From KeywordAuthorityRecord
                KeywordID = keyword
    Get_Authorities_In_Keyword(int keyword, set authority)
        Returns the set of AuthorityIDs for a keyword
        SQL:  Select AuthorityID
                From KeywordAuthorityRecord
                Where KeywordID = keyword
    Get_Details_In_Keyword_Authority(keyword, authority,
    char*details)
        Returns the ReferenceDetails of a KeywordAuthorityRecord.
        SQL:  Select ReferenceDetails
                From AuthorityDetails
                Where KeywordID = keyword
                And AuthorityID = authorityID
    Get_Number_Testimony_In_Keyword(int keyword)
        Returns the number of testimonies in a keyword appears in.
        SQL:  Select count (DISTINCT TestimonyID)
                From KeywordPhraseRecord
                KeywordID = keyword
    Get_Testimony_In_Keyword(int keyword, set testimony)
        Returns the set of TestimonyIDs that a keyword appears in.
        SQL:  Select TestimonyID
                From KeywordPhraseRecord
                Where KeywordID = keyword
```

```
Get_Number_Segment_In_Keyword(int keyword)
    Returns the number of segments in a keyword appears
    in.
    SQL:  Select count (DISTINCT SegmentID)
          From KeywordsSegmentRecord
          KeywordID = keyword
Get_Segment_In_Keyword(int keyword, set testimony)
    Returns the set of segmentIDs that a keyword appears in.
    SQL:  Select TestimonyID
          From KeywordSegmentRecord
          Where KeywordID = keyword
Get_Number_Phrases_In_Testimony_Keyword(int testimony,
int keyword)
    Returns the number of phrases that a keyword appears in
    for a given testimony.
    SQL:  Select count (DISTINCT PhraseID)
          From KeywordPhraseRecord
          Where TestimonyID = testimony
          And KeywordID = keyword
Get_Phrase_In_Testimony_Keyword(testimony, keyword, set
phrases)
    Returns the set of PhraseIDs that a keyword appears in
    for a given testimony.
    SQL:  Select Phrase ID
          From KeywordPhraseRecord
          Where TestimonyID = testimony
          And KeywordID = keyword
Is_String_In_Keyword_Label(char*search, int keyword,
boolean AnyFlag)
    Returns boolean if search string is contained in a
    keyword.
    SQL:  (AnyFlag = 0)
          Select count (*)
          From Keyword
          Where KeywordID = keyword
          And Label LIKE 'search'
    SQL:  (AnyFlag = 1)
          Select count (*)
          From Keyword
          Where KeywordID = keyword
          And Label LIKE '%search%'
Get_Keyword_In_Label_Search_String(char*search, int
AnyFlag, set*keyword)
    Returns the set of keywordIDs that match a label search string.
    SQL:  (AnyFlag = 0)
          Select KeywordID
          From Keyword
          Where Label LIKE 'search'
    SQL:  (AnyFlag = 1)
          Select count (*)
          Select KeywordID
          From Keyword
          Where Label LIKE '%search%'
Is_String_In_Keyword_Description(char*search, int keyword,
boolean AnyFlag)
    Returns boolean if search string is contained in a
    keyword description.
    SQL:  (AnyFlag = 0)
          Select count (*)
          From Keyword
          Where KeywordID = keyword
          And KWDescription LIKE Label
    SQL:  (AnyFlag = 1)
          Select count (*)
          From Keyword
          Where KeywordID = keyword
          And KWDescription LIKE '%search%'
Get_Keyword_In_Description_Search_String(char*search, int
AnyFlag, set*keyword)
    Returns the set of keywordIDs that match a description
    search string.
    SQL:  (AnyFlag = 0)
          Select KeywordID
          From Keyword
          Where KWDescription LIKE 'search'
    SQL:  (AnyFlag = 1)
          Select count (*)
          Select KeywordID
          From Keyword
          Where KWDescription LIKE '%search%'
Is_String_In_Keyword_Soundex(char*search, int keyword,
boolean AnyFlag)
    Returns boolean if search string is contained in a
    keyword soundex.
    SQL:  (AnyFlag = 0)
          Select count (*)
          From Keyword
          Where KeywordID = keyword
          And SoundexCode LIKE Label
    SQL:  (AnyFlag = 1)
          Select count (*)
          From Keyword
          Where KeywordID = keyword
          And SoundexCode LIKE '%search%'
Get_Keyword_In_Soundex_Search_String(char*search, int
AnyFlag, set*keyword)
    Returns the set of keywordIDs that match a soundexCode
    search string.
    SQL:  (AnyFlag = 0)
          Select KeywordID
          From Keyword
          Where SoundexCOde LIKE 'search'
    SQL:  (AnyFlag = 1)
          Select count (*)
          Select KeywordID
          From Keyword
          Where SoundexCode LIKE '%search%'
Keyword Inheritance Routines
    Get_Number_Parent_In_Keyword(int keyword)
        Returns number of parent KeywordIDs for a given keyword.
        SQL:  Select count (*)
              From KWInheritance
              Where KeywordID = keyword
    Get_Parent_In_Keyword(int keyword, set parents)
        Gets the set of parent KeywordIDs of a given keyword.
        SQL:  Select ParentKeywordID
              From KWInheritance
              Where Keyword ID = keyword
    Get_Prefferd_Parent_In_Keyword(int keyword)
        Returns the preferred parentTypeIDs of a given type.
        SQL:  Select ParentKeywordID
              From KWInheritance
              Where KeywordID = type
              And PrefKWParent = 1;
    Get_Number_Children_In_Keyword(int keyword)
        Returns count of child KeywordIDs for a given keyword.
        SQL:  Select count (*)
              From KWInheritance
              Where ParentKeywordID = keyword
    Get_Children_In_Keyword(int keyword, set children)
        Returns the set of child KeywordIDs of a given keyword.
        SQL:  Select KeywordIDID
              From KWInheritance
              Where ParentKeywordID = keyword
Person Routines
    Get_Name_In_Person(int person, char*name)
        Returns the full name of a person
        SQL:  Select FirstName, LastName
              From Person
              Where PersonID = person
    Get_PersonID_In_Testimony(int testimony)
        Returns the personID of a survivor who gave testimony.
        SQL:  Select SurvivorID
              From Testimony
              Where TestimonyID = testimony
    Get_TestimonyID_In_Person(int person)
        Returns the TestimonyID of the survivor identified by
        person ID.
        SQL:  Select TestimonyID
              From Testimony
              Where SurvivorID = person
    Is_String In_Person_Name(char*first, char*last, boolean
    AnyFlag)
        Returns number of PersonIDs who match first and last
        name search strings.
        SQL:  (AnyFlag = 0)
              Select count (*)
```

```
            From Person p, Survivor s
            Where p.PersonID = s.PersonID
            And FirstName LIKE 'first'
            AND LastName LIKE 'last'
    SQL:    (AnyFlag = 1)
            Select count (*)
            From Person p, Survivor s
            Where p.PersonID = s.PersonID
            And FirstName LIKE '%first%'
            And LastName LIKE '%last%'
Get_Person_In_Name_Search_String(char*first, char*last, int
AnyFlag, set*persons)
        Returns the set of personIDs that match a name search
        strings.
    SQL:    (AnyFlag = 0)
            Select PersonID
            From Person p, Survivor s
            Where p.PersonID = s.PersonID
            And FirstName LIKE 'first'
            And LastName LIKE 'last'
    SQL:    (AnyFlag = 1)
            Select PersonID
            Where p.PersonID = s.PersonID
            And FirstName LIKE '%first%'
            And LastName LIKE '%last%'
Thesaural Keyword Inheritance Routines
    Get_Keyword_In_Thesaural_Keyword(int thes_keyword)
        Returns the KeywordID of a thesaural keyword.
    SQL:    Select KeywordID
            From ThesauralKeyword
            Where ThesauralKWID = thes_keyword
    Get_Label_In_Thesaural_Keyword(int thes_keyword, char
*label)
        Returns the Label of a thesaural keyword.
    SQL:    Select ThesauraLabel
            From ThesauralKeyword
            Where ThesauralKWID = thes_keyword
    Is_String_In_Thesaural_Keyword_Label(char*search, int
thes_keyword, boolean AnyFlag)
        Returns number of thesaural keywords in which a search
        string is contained in a label.
    SQL:    (AnyFlag = 0)
            Select count (*)
            From ThesauralKeyword
            Where ThesauralKWID = thes_keyword (see
            NOTE)
            And ThesauralLabel LIKE 'search'
    SQL:    (AnyFlag = 1)
            Select count (*)
            From ThesauralKeyword
            Where ThesauralKWID = thes_keyword (see
            NOTE)
            And ThesauralLabel LIKE 'search'
    Get_Thesaural_Keyword_In_Label_Search_String(char*search
,int AnyFlag, set*keyword)
        Gets the set of keywordIDs that match a label search
        string.
    SQL:    (AnyFlag = 0)
            Select ThesauralKWID
            From ThesauralKeyword
            Where ThesauralLabel LIKE 'search'
    SQL:    (AnyFlag = 1)
            Select ThesauralKWID
            From ThesauralKeyword
            Where ThesauralLabel LIKE 'search'
Type Routines
    Get_Label_In_Type(int type, char*label)
        Returns the TypeLabel of a type.
    SQL:    Select TypeLabel
            From Type
            Where TypeID = type
    Get_Description_In_Type(int type, char*description)
        Returns the TypeDescription of a type.
    SQL:    Select TypeDescription
            From Type
            Where TypeID = type
    Get_Number_Keywords_In_Type(int type)
        Returns the number of keywords of a type.
    SQL:    Select count (*)
            From Keyword
            TypeID = type
    Get_Keyword_In_Type(int type, set keywords)
        Gets the set of keywords of a given type.
    SQL:    Select KeywordID
            From Keyword
            Where TypeID = type
    Is_String_In_Type_Label(char*search, int, type, boolean
AnyFlag)
        Returns number of TypeIDs where a search string is
        contained in a type label.
    SQL:    (AnyFlag = 0)
            Select count (*)
            From Type
            Where TypeID = type (see NOTE)
            And TypeLabel LIKE 'search'
    SQL:    (AnyFlag = 1)
            Select count (*)
            From Type
            Where TypeID = type (see NOTE)
            And TypeLabel LIKE '%search%'
    Get_Type_In_Label_Search_String(char*search, int AnyFlag,
set*types)
        Gets the set of TYpeIDs that match a label search string.
    SQL:    (AnyFlag = 0)
            Select TypeID
            From Type
            Where TypeLabel LIKE 'search'
    SQL:    (AnyFlag = 1)
            Select TypeID
            From Type
            Where TypeLabel LIKE '%search%'
    Is_String_In_Type_Description(char*search, int type, boolean
AnyFlag)
        Returns number of typeIDs where search string is
        contained in a type description.
    SQL:    (AnyFlag = 0)
            Select count (*)
            From Type
            Where TypeID = type (see NOTE)
            And TypeDescription LIKE 'search'
    SQL:    (AnyFlag = 1)
            Select count (*)
            From TYpe
            Where TYpeID = type (see NOTE)
            And TypeDescription LIKE '%search%'
    Get_Type_In_Description_Search_String (char*search, int
AnyFlag, set*types)
        Returns the set of TypeIDs that match a description
        search string.
    SQL:    (AnyFlag = 0)
            Select TypeID
            From Type
            Where TypeDescription LIKE 'search'
    SQL:    (AnyFlag = 1)
            Select TypeID
            From Type
            Where Type Description LIKE '%search%'
Type Inheritance Routines
    Get_Number_Parent_In_Type(int type)
        Returns number of parentTypeIDs for a given type.
    SQL:    Select count (*)
            From TypeInheritance
            Where TypeID = type
    Get_Parent_In_Type(int type, set parents)
        Returns the set of parentTypeIDs of a given type.
    SQL:    Select ParentTypeID
            From TypeInheritance
            Where TypeID = type
    Get_Prefferd_Parent_In_Type(int type)
        Returns the preffered parentTypeIDs of a given type.
    SQL:    Select ParentTypeID
            From TypeInheritance
            Where TypeID = type
            And PrefTypeParent = 1;
```

```
Get_Number_Children_In_Type(int type)
    Returns number of child TypeIDs for a given type.
    SQL:  Select count (*)
              From TypeInheritance
              Where ParentTypeID = type
Get_Children_In_Type(int type, set children)
    Returns the set of child TypeIDs of a given type.
    SQL:  Select TypeID
              From TypeInheritance
              Where ParentTypeID = type
```

Thus, a method an apparatus for managing multimedia assets has been provided.

What is claimed is:

1. A method of interfacing components in a multimedia system comprising:

defining a generalized protocol for interfacing components of a multimedia system, said generalized protocol comprising commands configured to access multimedia data, said multimedia data associated with a catalogue;

invoking a search request using said generalized protocol, said search request configured to initiate a search of said catalogue to identify multimedia data;

communicating between at least two of said components using said generalized protocol;

returning a search response using said generalized protocol, said search response identifying a plurality of catalogue elements;

invoking a retrieval request using said generalized protocol, said retrieval request specifying at least one of said plurality of said catalogue elements;

invoking a transmit request using said generalized protocol, said transmit request configured to transmit multimedia data identified by said at least one of said plurality of catalogue elements.

2. The method of claim 1 wherein said generalized protocol is an application programming interface.

3. The method of claim 1 wherein said components comprise a browser, an index server, an archive server and a method player.

4. The method of claim 3 wherein said invoking said search request is communicated between said browser and said index server.

5. The method of claim 3 wherein invoking said retrieval request is communicated between said browser and said archive server.

6. The method of claim 3 wherein said invoking said transmit request is communicated between said browser and said method player.

7. The method of claim 1 wherein said catalogue comprises a plurality of catalogue elements and a plurality of segment elements, each of said plurality of segment elements identifying at least one of said plurality of catalogue elements, said request comprising a request for data associated with at least one of said plurality of segment elements.

8. The method of claim 7 wherein said data associated with at least one of said plurality of segment elements comprises an identification of a plurality of catalogue elements, a plurality of index elements and a plurality of segment elements contained in said at least one of said plurality of segment elements.

9. The method of claim 1 wherein said catalogue further comprises a plurality of catalogue elements and a plurality of segment elements, each of said plurality of segment elements associated with a search of said catalogue, said each of said plurality of segment elements identifying at least one of said plurality of catalogue elements, said communicating between at least two of said components further comprising:

generating a search response to said search request, said search response identifying one of said segment elements.

10. The method of claim 1 wherein said catalogue comprises a plurality of catalogue elements, said request comprising a request for data associated with at least one of said plurality of catalogue elements.

11. The method of claim 1 wherein said catalogue comprises a plurality of index elements, said request comprising a request for data associated with at least one of said plurality of index elements.

12. The method of claim 11 wherein said catalogue further comprises a plurality of catalogue elements, said data associated with at least one of said plurality of index elements identifying at least one association between said at least one of said plurality of index elements and at least one of said plurality of catalogue elements.

13. The method of claim 11 wherein said catalogue further comprises a plurality of segment elements, each of said plurality of segment elements identifying at least one of said plurality of catalogue elements, said sending a request comprising a request for data associated with at least one of said plurality of index elements further comprising:

sending a request using said generalized protocol, said request comprising a request to identify those of said plurality of segment elements associated with said at least one of said plurality of index elements.

14. The method of claim 1 wherein said catalogue comprises a plurality of index elements, said catalogue further comprises a plurality of type elements, said plurality of type elements comprising a classification scheme used in classifying said plurality of index elements, said request comprising a request for data associated with at least one of said type elements.

15. A computer program product comprising:

a computer usable medium having computer readable program code embodied therein configured to interface components in a multimedia system comprising:

computer readable program code configured to cause a computer to define a generalized protocol for interfacing components of a multimedia system, said generalized protocol comprising commands configured to access multimedia data, said multimedia data associated with a catalogue;

computer readable program code configured to cause a computer to invoke a search request using said generalized protocol, said search request configured to initiate a search of said catalogue to identify multimedia data;

computer readable program code configured to cause a computer to communicate between at least two of said components using said generalized protocol;

computer readable program code configured to cause a computer to return a search response using said generalized protocol, said search response identifying a plurality of catalogue elements;

computer readable program code configured to cause a computer to invoke a retrieval request using said generalized protocol;

computer readable program code configured to cause a computer to invoke a transmit request using said generalized protocol, said transmit request configured to transmit multimedia data identified by said at least one of said plurality of catalogue elements.

16. The computer program product of claim 15 wherein said retrieval request specifies at least one of said plurality of said catalogue elements.

17. The computer program product of claim 15 wherein said catalogue further comprises a plurality of catalogue elements and a plurality of segment elements, each of said plurality of segment elements associated with a search of said catalogue, said each of said plurality of segment elements identifying at least one of said plurality of catalogue elements.

18. The computer program product of claim 15 wherein said catalogue comprises a plurality of index elements, and a plurality of type elements, said plurality of type elements comprising a classification scheme used in classifying said plurality of index elements, said retrieval request comprising a request for data associated with at least one of said type elements.

* * * * *